Feb. 23, 1937.　　　　E. E. HEWITT　　　　2,071,755
FLUID PRESSURE BRAKE
Filed May 2, 1935　　　　8 Sheets-Sheet 1
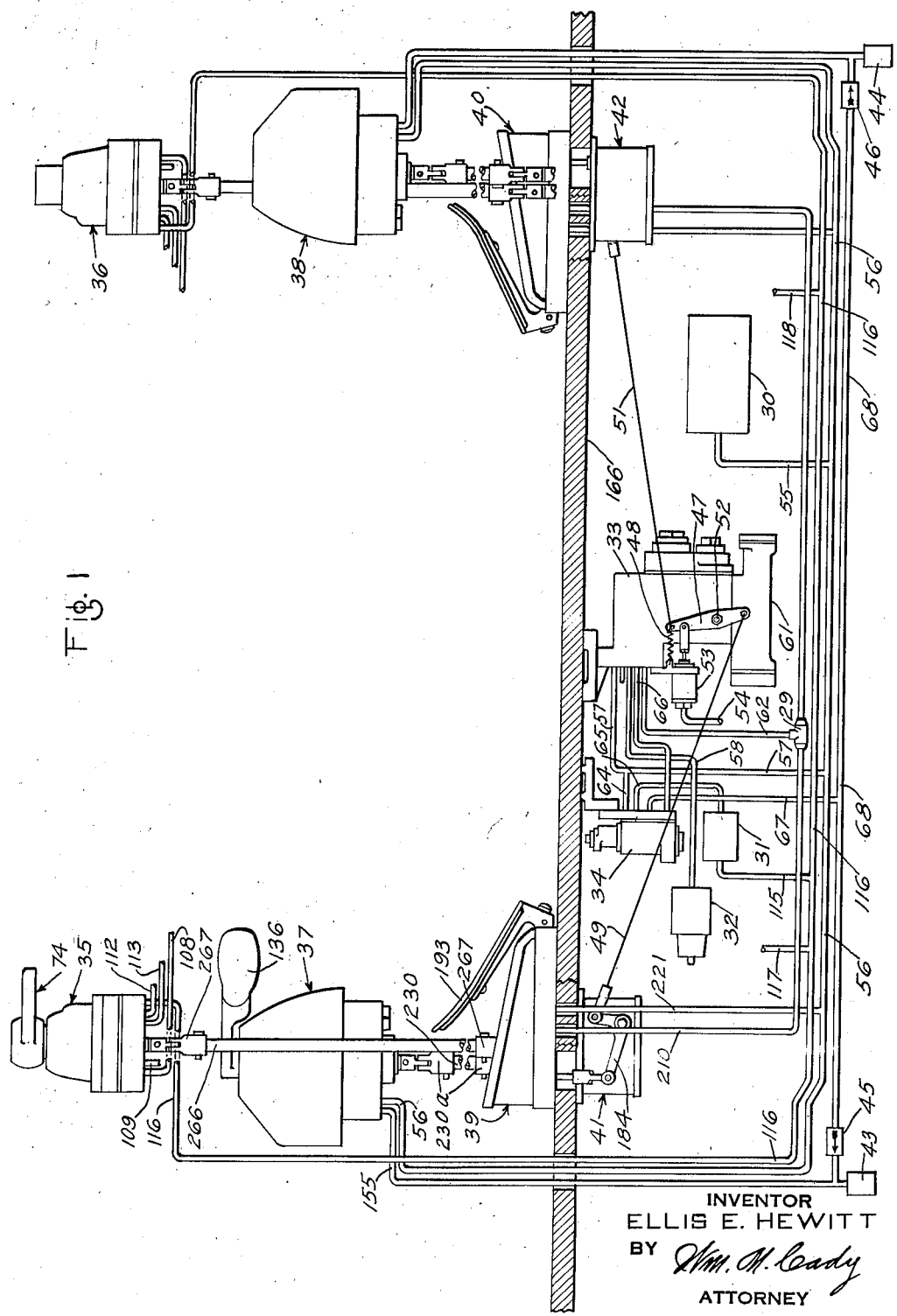
INVENTOR
ELLIS E. HEWITT
BY Wm. M. Cady
ATTORNEY Feb. 23, 1937.  E. E. HEWITT  2,071,755
FLUID PRESSURE BRAKE
Filed May 2, 1935  8 Sheets-Sheet 2
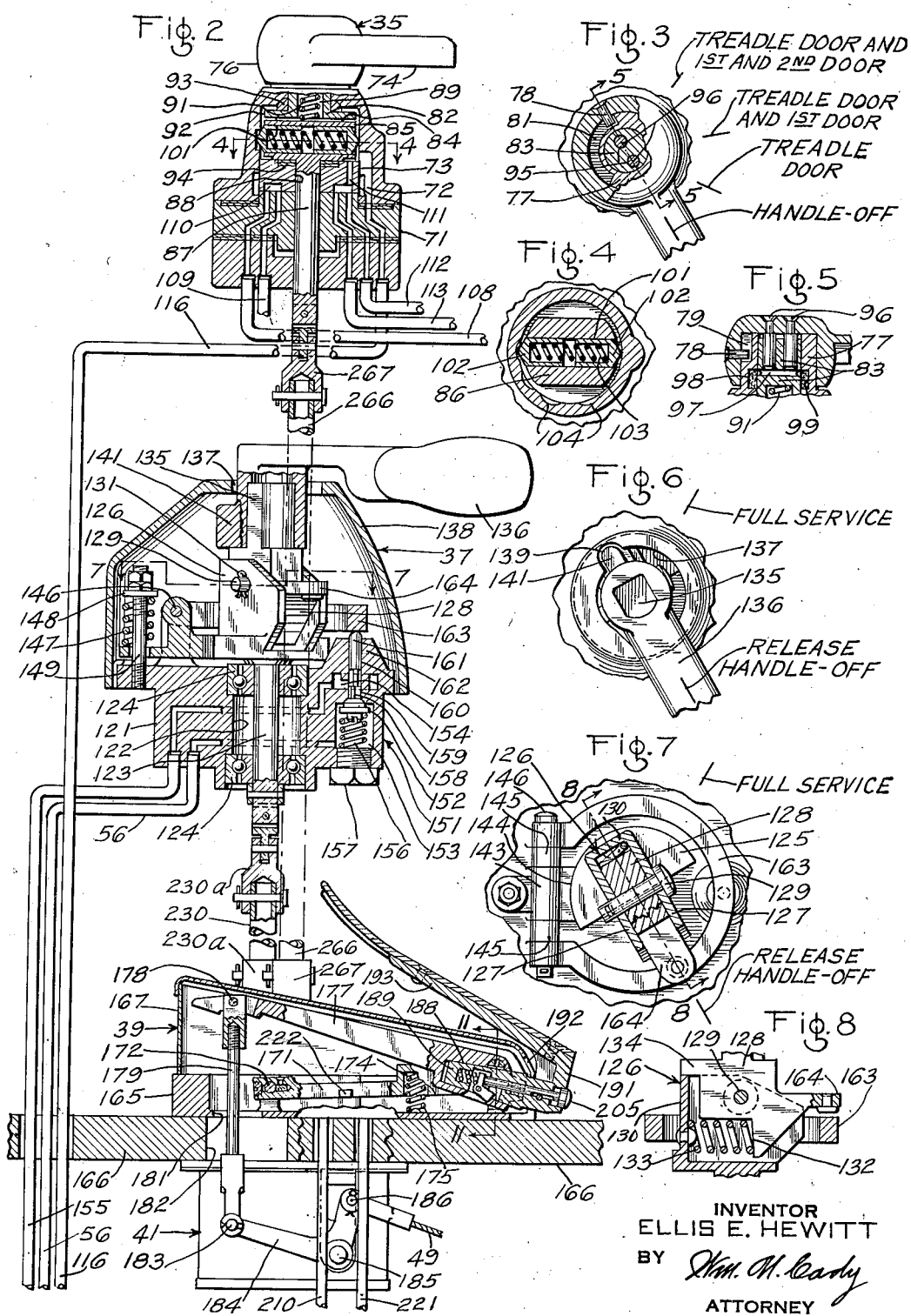
INVENTOR
ELLIS E. HEWITT
BY Wm. M. Cady
ATTORNEY Feb. 23, 1937.  E. E. HEWITT  2,071,755
FLUID PRESSURE BRAKE
Filed May 2, 1935   8 Sheets-Sheet 3
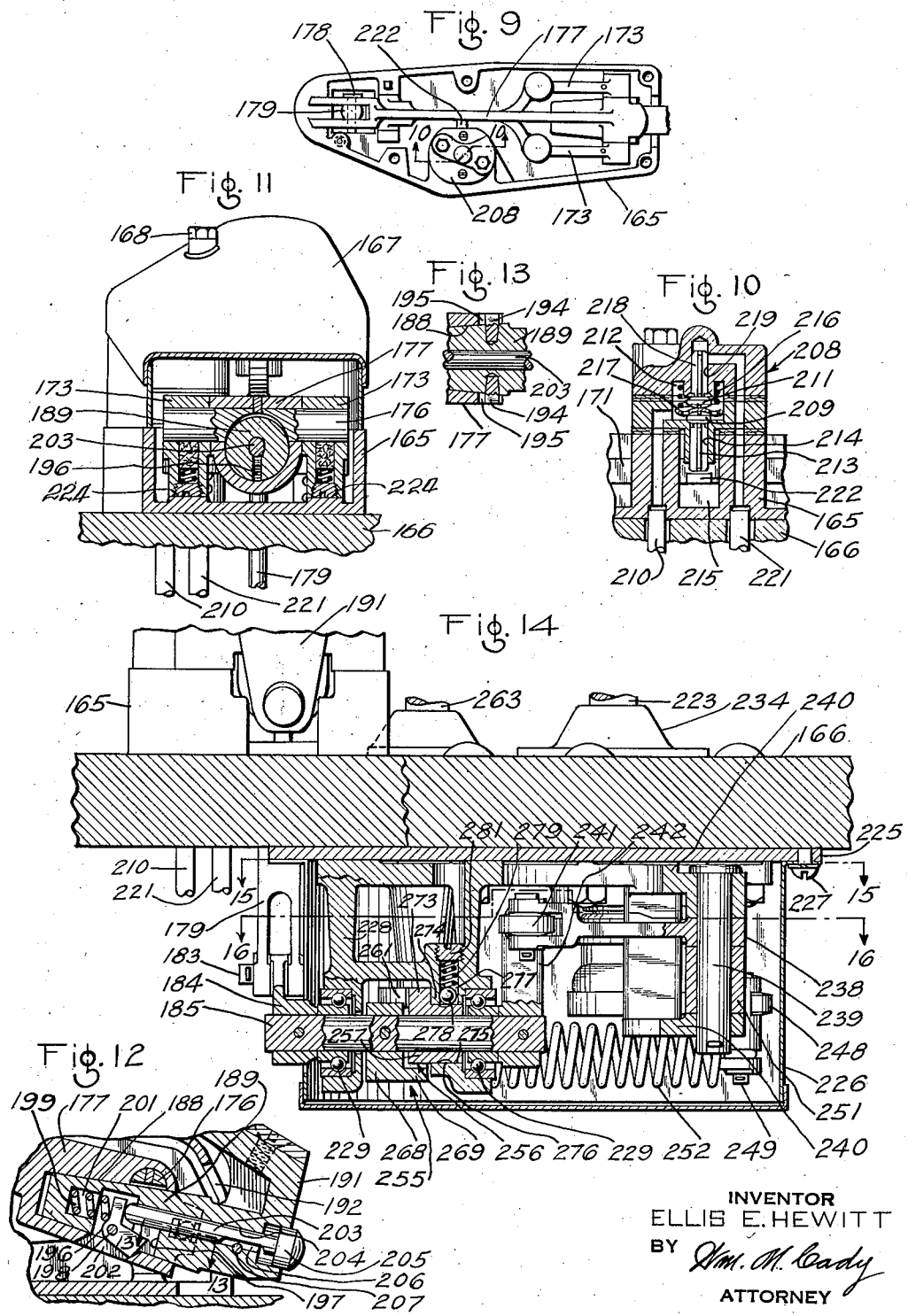
INVENTOR
ELLIS E. HEWITT
BY Wm. M. Cady
ATTORNEY Feb. 23, 1937.  E. E. HEWITT  2,071,755
FLUID PRESSURE BRAKE
Filed May 2, 1935   8 Sheets-Sheet 4

INVENTOR
ELLIS E. HEWITT
BY  Wm. M. Cady
ATTORNEY

Feb. 23, 1937.  E. E. HEWITT  2,071,755
FLUID PRESSURE BRAKE
Filed May 2, 1935  8 Sheets-Sheet 5
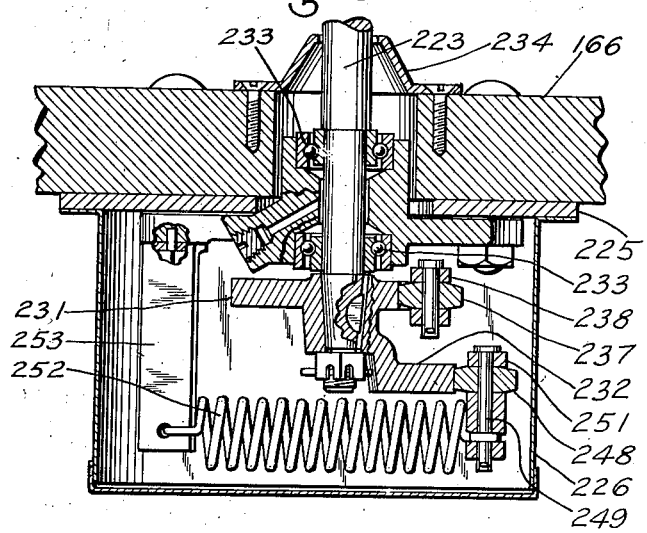
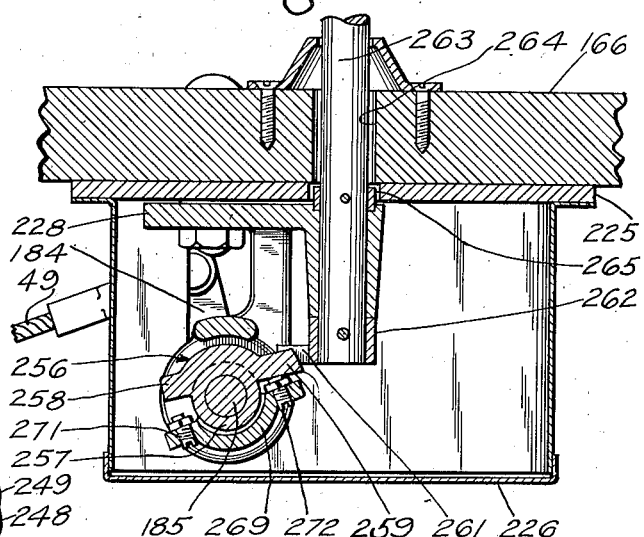
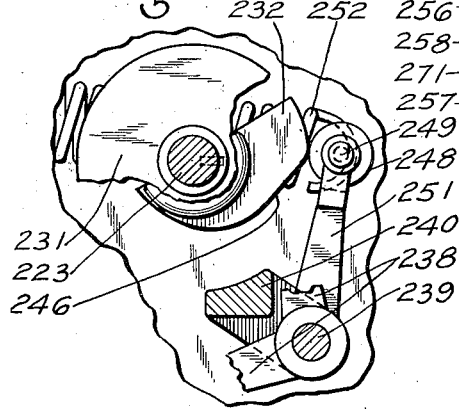
INVENTOR
ELLIS E. HEWITT
BY *Wm. M. Cady*
ATTORNEY

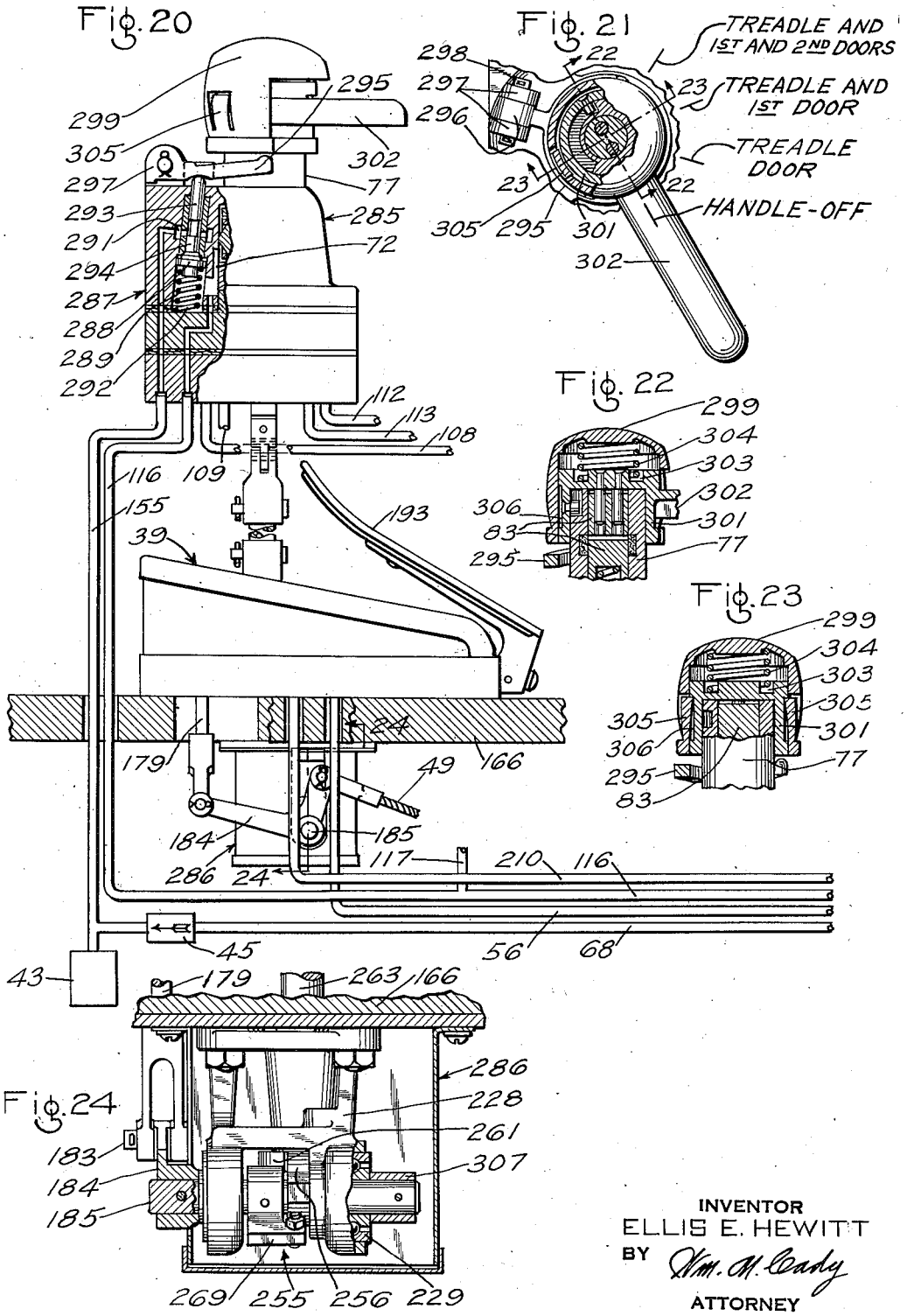

Feb. 23, 1937. E. E. HEWITT 2,071,755
FLUID PRESSURE BRAKE
Filed May 2, 1935 8 Sheets-Sheet 7
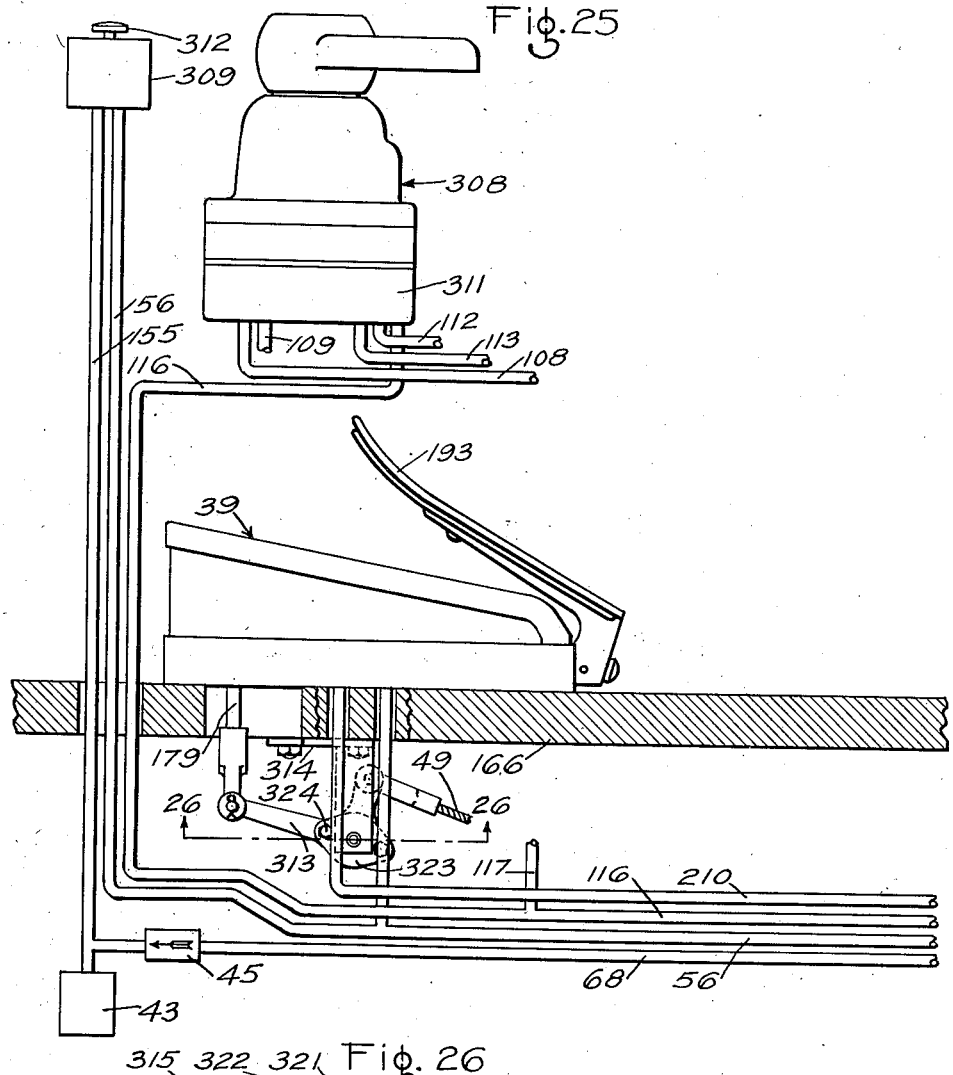
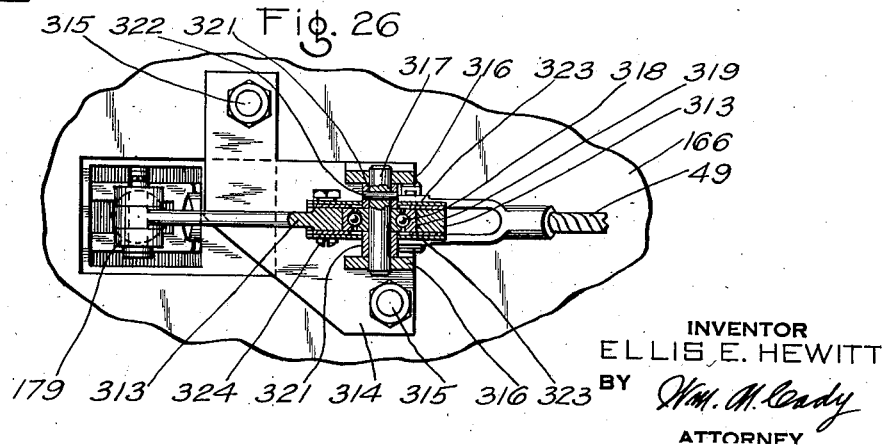
INVENTOR
ELLIS E. HEWITT
BY
ATTORNEY Feb. 23, 1937.                E. E. HEWITT                2,071,755
                            FLUID PRESSURE BRAKE
                            Filed May 2, 1935           8 Sheets-Sheet 8

INVENTOR
ELLIS E. HEWITT
BY Wm. M. Cady
ATTORNEY

Patented Feb. 23, 1937

2,071,755

UNITED STATES PATENT OFFICE 2,071,755

FLUID PRESSURE BRAKE

Ellis E. Hewitt, Edgewood, Pa., assignor to The Westinghouse Air Brake Company, Wilmerding, Pa., a corporation of Pennsylvania Application May 2, 1935, Serial No. 19,378

44 Claims. (Cl. 303—6.1)

This invention relates to fluid pressure brakes, and particularly to safety car equipment for operating fluid pressure brakes.

It is an object of my invention to provide safety car equipment of improved character, including an improved door control device, a combination door and sanding control device, a manually operated combination brake and sanding control device, and a foot operated service brake and dead man's emergency control device.

Another object is to provide various arrangements of the above-indicated control devices, suited to different service requirements.

Another object is to provide a mechanism for so interlocking a brake controlling valve device and a door control device that the valve device must have been operated to effect at least a predetermined brake cylinder pressure sufficient to stop the car in effecting a service application of the brakes, before the door control device may be operated to a door opening position and so that operation of the valve device to release the brakes is prevented unless the door control device is in door closing position.

Another object is to provide an interlocking mechanism of the character just indicated, adapted to permit reduction in brake cylinder pressure, upon the initiation of release of the brakes after a service application of the brakes and without operating the door control device to door closing position, to a degree merely sufficient to hold the car at rest and substantially less than the predetermined degree of brake cylinder pressure which must be attained before operation of the door control device to door opening position is permitted.

A further object is to provide an operating mechanism adapted to maintain a manually operated brake control device in a service application position to which it is operated, notwithstanding that movement to a service application position is yieldingly resisted and that the force applied to operate the control device is relieved or removed.

The above and other objects made apparent hereinafter, are attained by illustrative embodiments described hereinafter and shown in the accompanying drawings, wherein Figure 1 is a diagrammatic elevational view, of a safety car control equipment embodying features of my invention, Figure 2 is an enlarged elevational view, partly in section, showing details of construction of the door controlling device, the hand operated brake and sand control device, and the foot operated brake control device shown in Figure 1, Figure 3 is a fragmentary plan view, partly broken away, of the door controlling device shown in Figure 2, Figure 4 is a sectional view, taken on line 4—4 of Figure 2, Figure 5 is a fragmentary sectional view, taken on line 5—5 of Figure 3, Figure 6 is a fragmentary plan view of the hand operated brake and sand control device shown in Figure 2, Figure 7 is a sectional view, taken on line 7—7 of Figure 2, Figure 8 is a fragmentary sectional view, taken on line 8—8 of Figure 7, Figure 9 is a plan view of the foot operated brake control device shown in Figure 2, the cover plate being removed and the foot pedal being broken off, Figure 10 is a sectional view, taken on line 10—10 of Figure 9, Figure 11 is a sectional view, taken on line 11—11 of Figure 2, Figure 12 is a fragmentary enlarged sectional view, showing in further detail the foot operated brake controlling device of Figure 2, Figure 13 is a fragmentary sectional view, taken on line 13—13 of Figure 12, and showing a detail of construction whereby the foot pedal of the foot operated control device is held in position, Figure 14 is an elevational view, partly in section, of the operating mechanism whereby association of the hand operated brake control device and foot operated brake control device is effected, and whereby interlocking of the door controlling device and the hand operated and foot operated brake controlling devices is effected, Figure 15 is a sectional view, taken on line 15—15 of Figure 14, Figure 16 is a sectional view, taken on line 16—16 of Figure 14, Figure 17 is a fragment of the view shown in Figure 16, and having a portion broken away, Figure 18 is a sectional view, taken on line 18—18 of Figure 16, Figure 19 is a sectional view, taken on line 19—19 of Figure 16, Figure 20 is an enlarged fragmentary elevational view, partly in section, of a modification of the equipment shown in Figure 1, Figure 21 is a fragmentary plan view, partly broken away, of the door and sand control device shown in Figure 20, Figure 22 is a fragmentary sectional view, taken on line 22—22 of Figure 21, Figure 23 is a fragmentary sectional view, taken on line 23—23 of Figure 21.

Figure 24 is a sectional view, taken on line 24—24 of Figure 20, showing a modification of the operating mechanism of Figure 14 adapted to the requirements of the equipment employed in Figure 20, Figure 25 is an enlarged fragmentary elevational view, of another modification of the equipment shown in Figure 1, Figure 26 is a sectional view taken on line 26—26 of Figure 25.

Figure 15:
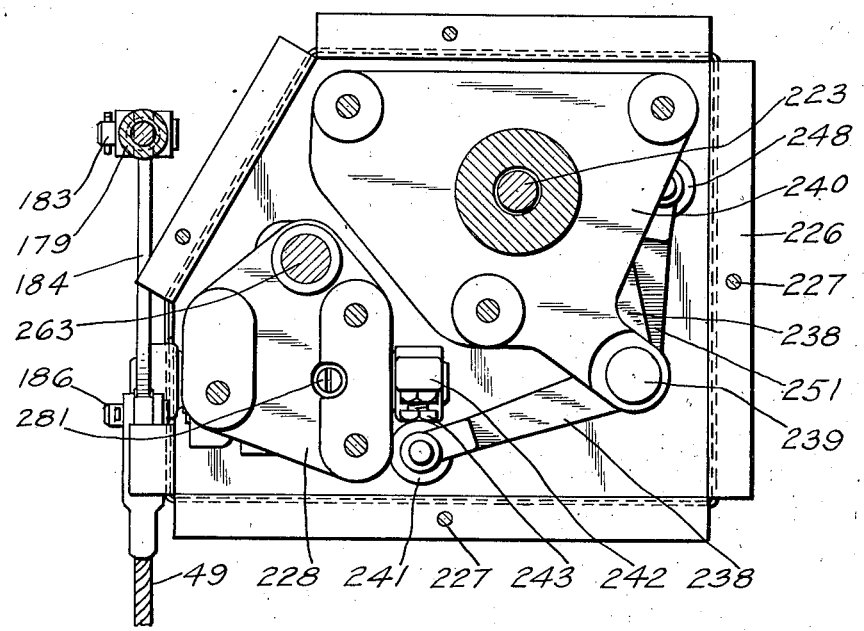

Referring to Figure 1, the apparatus of the embodiment shown, includes a main reservoir 30 which is supplied with fluid under pressure from a compressor (not shown), a sanding reservoir 31, a brake cylinder 32, a self-lapping brake controlling valve device 33, an automatic sanding valve device 34, and a double check valve device 29. Disposed, respectively, at opposite ends of the car are a pair of manually operated door control devices 35 and 36, a pair of manually operated brake and sanding control devices 37 and 38, a pair of foot operated service and dead man's emergency brake control devices 39 and 40, a pair of operating mechanisms 41 and 42, a pair of sanding devices 43 and 44, and a pair of non-return check valve devices 45 and 46.

The self-lapping brake valve device 33 and the automatic sanding valve device 34 may be of any suitable type and, as shown illustratively, are identical with the corresponding devices fully shown and described in the copending applications of David W. Lloyd, Serial No. 698,242 and Serial No. 698,243, both of said applications being filed on November 16, 1933 and assigned to the assignee of this application.

A brief description of the valve devices 33 and 34 should thus suffice for present purposes. The self-lapping brake valve device 33 is manually operated to effect a service application of the brakes by means of an operating lever 47, normally yieldingly urged into the release position thereof shown in Figure 1, by a spring 48, and adapted to be rotated in a clockwise direction by a pulling force on cables or rods 49 and 51, secured respectively at opposite ends of lever 47 and extending respectively to opposite ends of the car. The lever 47 is keyed or otherwise suitably secured to an operating shaft 52 which extends into the casing of the valve device 33 and which is adapted by rotation thereof to effect operation of the supply and release valves (not shown) therein.

A fluid pressure actuated piston device 53 may also be provided, adapted to be supplied with fluid under pressure through a pipe 54, for operating the lever 47 or for preventing movement of the lever 47 back to release position under certain conditions, for example, as long as a passenger depresses a treadle device or as long as a door on the car is open, after the manner disclosed in my copending application, Serial No. 698,231, filed November 16, 1933 and assigned to the assignee of this application.

Rotation of lever 47 in a clockwise direction operates valve device 33 so as to supply fluid under pressure from main reservoir 30 to the brake cylinder 32, to effect an application of the brakes, through pipes 55, 56, 57, valve device 33, and pipe 58, the degree of brake cylinder pressure attained being in proportion to the degree of movement of lever 47 out of release position.

A fluid pressure actuated piston device (not shown), within the casing section 61 of the valve device 33, is effective to so operate the valve device 33 as to cause an emergency application of the brakes when the fluid under pressure normally supplied thereto through a safety control pipe 62 is vented.

The automatic sanding valve device 34 is normally conditioned to establish communication from a branch pipe 64 opening into pipe 57, to a pipe 65 leading to the sanding reservoir 31, and is adapted, upon operation thereof, to close the communication between pipes 64 and 65 and open communication between pipe 65 and a pipe 67 opening into a pipe 68 leading to the check valve devices 45 and 46 and the sanding devices 43 and 44.

Operation of the automatic sanding valve device is effected when fluid under pressure is supplied to an actuating piston (not shown) thereof through a pipe 66 connecting the sanding valve device 34 and the brake valve device 33, a valve (not shown) operated by the fluid pressure actuated piston device of brake valve device 33 and normally opening pipe 66 to atmosphere, being effective upon operation to establish communication between pipe 57 and pipe 66 through the brake valve device 33.

The door control devices 35 and 36 being identical, a description of only one should suffice. Referring to Figure 2, door control device 35 comprises a sectional casing 71 having a chamber 72 containing a rotary valve 73 adapted to be turned to various positions, as indicated in Figure 3, by a removable operating handle 74.

The handle 74 has a socket or sleeve portion 76 adapted to fit over a cooperating sleeve portion 77 of casing 71, a pin 78 (Figures 3 and 5) secured in the wall of the socket portion 76 of the handle 74 projecting inwardly to cooperatively enter a vertical receiving slot 79 in casing sleeve portion 77 only in the "handle-off" position of handle 74 and to enter a horizontal slot 81 on the outside surface of the casing sleeve portion 77 when the handle 74 is turned from handle-off position. Removal of handle 74, except in handle-off position, is thus prevented.

A yoke member 82 is provided having a cylindrical shank 83 closely fitting and rotatable within the casing sleeve portion 77 and a transversely bifurcated portion having a pair of prongs 84, only one of which is shown in Figure 2, positioned within the upper part of chamber 72.

An operating member 85 is also provided having a transverse head portion 86 which fits closely between the prongs 84 of the yoke member 82, and a stem or shaft 87 extending through an opening 88 in rotary valve 73 in suitably interlocked relation and projecting downwardly exteriorly of the casing 71 for a purpose hereinafter made apparent.

The yoke 82 has a longitudinal bore or recess 89 opening between the prongs 84 thereof, and a coil spring 91 disposed in bore 89 and interposed between the yoke 82 and the head of the operating member 85, yieldingly urges a flange 92 on the yoke 82 into sealing contact with a packing 93 to prevent leakage of fluid under pressure from chamber 72 along the shank portion of the yoke 82, and also urges the head portion 86 of the operating member 85 into sealing contact with a packing 94 to prevent leakage of fluid under pressure from chamber 72 along the shaft 87 of the operating member 85.

The end of shank 83 of the yoke 82 has a pair of transversely spaced longitudinally extending bores 95 adapted to slidably receive a pair of correspondingly spaced pins 96 on the socket portion 76 of handle 74 when the socket portion 76 is properly fitted over the casing sleeve portion 77, for interlocking the handle 74 and the yoke 82. Thus, turning of handle 74, effects a corresponding turning of yoke 82, operating member 85 and rotary valve 73. The shank 83 of yoke 82 also has a transverse bore 97, into which the bores 95 open, and which registers with an annular groove 98 on the inner surface of the casing sleeve portion 77. An oil swab packing ring 99 is fitted into the groove 98 and is adapted to receive lubricant through the bores 95 and bore 97 for lubricating the contacting surfaces of the shank 83 and the casing sleeve portion 77.

The head portion 86 of operating member 85 has a transverse bore 101 having therein a pair of latch members 102 yieldingly urged in opposite directions by a coil spring 103 interposed therebetween, the latch members being urged into contact with the inner surface of the casing within chamber 72 and adapted to cooperate with a plurality of notches 104 in the wall of the casing, which notches are suitably spaced and positioned to define the various operating positions of the handle 74.

Normally, in the position shown in Figure 2, rotary valve 73 establishes communication from a pipe and passage 108, leading from a door engine device (not shown) for operating the treadle door, to an atmospheric passage and pipe 109, through a cavity 110 therein, and also establishes communication, through a port 111 therein, from rotary valve chamber 72 to a passage and pipe 112 and a passage and pipe 113, leading respectively to the pair of door engine devices (not shown) which separately operate the first door and second door respectively, the chamber 72 being supplied with fluid under pressure from sanding reservoir 31 through a pipe 115 and a pipe and passage 116.

The door engine devices may be of any suitable type, such as shown in the above-mentioned copending application of David W. Lloyd, Serial No. 698,242, and fluid under pressure is constantly supplied thereto from sanding reservoir 31 through pipe 117 connected to the sanding reservoir pipe 116. Pipe 118, also connected to pipe 116, leads to the door engine devices (not shown) controlled by the door control device 36.

With the handle 74 of door control device 35 in the position shown in Figure 2, the door engines are actuated to close the doors operated thereby. Turning of the door handle 74 to the "treadle door" position, indicated in Figure 3, turns the rotary valve 73 so that it connects pipe 108 to chamber 72 whereby fluid under pressure is supplied into pipe 108 and, upon operation of the usual treadle controlled valve, to the treadle door engine to effect opening of the treadle door. With the handle 74 in "treadle and first door" and "treadle door, first and second door" positions, the rotary valve 73 maintains the supply of fluid under pressure to pipe 108 and connects, in the first case, pipe 112 to atmospheric passage 109, and in the second case both pipes 112 and 113 to atmospheric passage 109. Upon venting of pipes 112 and 113, the door engines to which they lead are respectively actuated by the fluid under pressure supplied through pipe 117 to open the doors operated thereby.

The brake and sanding control devices 37 and 38 being identical, a description of only one is given herein. Referring to Figures 2, 7, and 8, the brake control device 37 comprises a casing section or bracket 121, having a centrally bored opening 122 through which an operating shaft 123 extends, the shaft 123 being suitably supported for rotation, as by a pair of ball bearing members 124 received in counter-bored portions at opposite ends respectively of the opening 122. Preferably integrally formed at the upper end of shaft 123 is a channel or yoke 126 of U-shape having spaced side flanges 127 on opposite sides of the rotative axis of shaft 123, the flanges 127 being joined by a base portion 130 at one side of and parallel to the axis of shaft 123. The lower end of channel 126 has a semi-circular disc 125, preferably integrally formed therewith, and perpendicular to the axis of shaft 123.

An operating member 128 is closely fitted between the side flanges 127 of the channel 126 and is mounted for pivotal movement on a pin 129 supported at opposite ends by the flanges 127, the operating member having a shoulder 132 thereon beneath the pin and a coil spring 133 being interposed between the shoulder 132 and the base portion 130 of the channel 126, to yieldingly urge the operating member into upright position. A stop lug 134 on the operating member 128 engages the upper end of the base portion 130 of channel 126 to limit the pivotal movement of the operating member 128 by spring 133 in the upright position of the operating member.

The upper end or shank 135 of the operating member is of suitable configuration so as to interlock with the socket portion of a removable operating handle 136, which socket portion is adapted to be inserted through an opening 137 in a cover member 138 secured to bracket 121 as by bolts or screws (not shown). The opening 137 has a suitably positioned notch or groove 139 (Figure 6) and the socket portion of handle 136 has a lug or rib 141 for cooperating with the groove 139, to prevent entry or removal of the socket portion of handle 136 through opening 137 unless the handle 136 is oriented in "handle-off" or "release" position, as indicated in Figure 6.

In order to frictionally resist the rotary operating movement of the handle 136 and shaft 123, for a purpose hereinafter made clear, a friction shoe 143 is provided, having a curved surface 144 (Figure 7) conforming to the curvature of the peripheral surface of the semi-circular disc 125, the shoe 143 being pivotally suspended between a pair of spaced lugs 145 on a pin 146 supported by the lugs and being urged into frictional engagement with the disc 125 by an adjustably tensioned coil spring 147 which is interposed between an extension of the shoe 143 and a collar or washer 148 supported on a stud bolt 149 secured to the casing 121.

A sanding control valve device 151 is embodied in the device 37 and is adapted to be operated by the handle 136. The valve device 151 comprises a valve 152 for controlling the supply of fluid under pressure from a chamber 153 in bracket 121, which chamber is constantly connected to the main reservoir 30 through pipe and passage 56, to a chamber 154 in the bracket 121, the chamber 154 being constantly connected to the sanding device 43 through a passage and pipe 155.

The valve 152 is disposed in chamber 153 and is normally yieldingly urged into seated relation on its valve seat by a spring 156 interposed between valve 152 and a screw plug 157 closing the chamber 153. The valve 152 has a fluted stem 158 extending through a bore 159 connecting the chambers 153 and 154. Closely fitted and slidably operable in a bore 160 which is in axial alignment with bore 157, is a stem 161 having an inner fluted end portion which abuts and operatively engages the end of stem 158 within chamber 154, and an outer end portion which projects above the surface of a frusto-conical raised portion 162 on the upper surface of the bracket 121.

A bail ring 163, pivotally mounted at the extremities thereof on the pin 146 and surrounding the channel 126 rests on the projecting end of stem 161 and is normally held in the position shown in Figure 2 by the valve spring 156. When the end of handle 136 is pressed downwardly against the force of spring 133, an extension 164 on the operating member 128 engages the bail ring 163 and causes the ring to move the stem 161 downwardly to unseat the valve 152 against the force of spring 156. The degree of unseating movement of valve 152 by the bail ring 163 is limited by the engagement of the ring with the upper surface of the frusto-conical raised portion 162 surrounding the stem 161.

The foot operated brake controlling devices 39 and 40 are similar to that shown and described in the above-mentioned copending application, Serial No. 698,242, and being identical in construction, a description of only the device 39 will therefore be given. Referring to Figures 2, 9, 10, 11, 12, and 13, the device 39 comprises a casing of any suitable construction, such as a base 165, adapted to be secured to the floor 166 of the car, and a cover member 167 removably secured to the base 165, as by a bolt 168. The device 39 further comprises a lever 171, pivotally mounted at one end on a pin 172 secured to the base 165, and having a pair of laterally spaced prongs 173 at the opposite end, each prong having a recess 174 therein opening downwardly for partially receiving and for positioning springs 175, interposed between the lever 171 and the base 165 for yieldingly urging the lever upwardly. Pivotally mounted at one end between the prongs 173 and on a pin 176 supported at opposite ends by the prongs 173, is another lever 177, which is pivotally connected at the opposite end, by a pin 178, to an operating rod 179. The rod 179 extends downwardly, through an opening 181 in the base 165 and an opening 182 in the floor 166, to a point below the floor where it is pivotally connected, as by a clevis and a pin 183, to the end of one arm of a bell crank lever 184 which is pinned or keyed, at the fulcrum thereof, to a shaft 185. The shaft 185 is an operating part of operating mechanism 41, as will be hereinafter described. The cable or rod 49 is suitably connected, as by a clevis and a pin 186, to the end of the other arm of the bell crank lever 184.

The end of lever 177 pivoted on pin 176 is formed as a socket and has an inwardly tapered bore 188 for receiving the correspondingly tapered leg portion 189 of a foot operated member 191, the cover member 167 and base 165 being adapted to permit entry of the leg portion 189 into the bore 188, through a suitable opening 192. The foot operated member 191 further comprises a pedal 193 extending back over the cover member 167, for receiving the foot of the operator.

It will thus be seen that when the toe end of pedal 193 is depressed, the lever 177 is pivoted about the pin 176 to move the rod 179 downwardly, which results in counter-clockwise rocking movement of bell crank 184 and consequently a pull on the cable 49 to operate the brake controlling valve device 33.

A pair of oppositely extending pins 194 (Figure 13) on the tapered leg 189 are adapted to enter into receiving slots 195 in the socket portion of the lever 177 and thus prevent turning of the foot member 191 in the bore 188.

Latching mechanism is provided for removably securing the leg 189 of the foot member 191 in the bore 188, which comprises a latch 196 (Figure 12) in the form of a bell crank, the latch being pivotally mounted in a recess 197 in the leg 189 on a pin 198, and having the outer arm thereof urged out of the recess 197 by a coil spring 199 interposed between the inner arm and the end of a longitudinal bore 201 in the leg 189. When the leg 189 is inserted into bore 188, the outer latch arm is pressed into the recess 197 and when the leg is fully fitted in the bore, the spring 199 snaps the outer latch arm out of the recess 197 and into interlocking relation with an opening 202 in the socket portion of lever 177. The latch 196 is retrieved to permit the foot operated member 191 to be removed, by means of a manually operable plunger 203, which is slidable in a longitudinal bore 204 extending to the outside of the foot member 191, the inner end of the plunger 203 being adapted to engage the inner arm of the latch 196 and to cause inward movement of the outer arm of the latch by overcoming the spring 199, when the outer end of the plunger, having a button 205 thereon, is pressed inwardly. The plunger 203 has a longitudinal groove or slot 206 on the outside thereof, and a pin 207 extending transversely through the bore 204 and slot 206 prevents removal of the plunger from the bore 204.

The device 39 further includes a valve device 208 (Figures 9 and 10) contained in a casing section removably secured to base 165, which valve device 208 comprises a pair of oppositely seating valves 209 and 211 contained in a chamber 212, which chamber is connected to the safety control pipe 62 through a passage and pipe 210 and double check valve device 29.

The valve 209 has a fluted stem 213 extending through a bore 214 into a chamber 215 which is open to atmosphere, and is urged into seated relation on its seat to cut off communication through bore 214 from chamber 212 to atmosphere by a spring 216 in chamber 212, which spring is interposed between a wall of the valve casing and a collar 217 abutting the end of the valve 209.

The valve 211 has a fluted stem 218 which operates in a bore 219, vertically aligned with bore 214 and connecting chamber 212 to a passage and pipe 221 which opens into the main reservoir pipe 56, the valve 211 abutting and resting on the opposite side of the collar 217 to that which the valve 209 abuts. When the valve 209 is seated, the valve 211 is unseated by force of gravity and fluid under pressure supplied through pipe and passage 221 to open communication between the main reservoir pipe 221 and the passage and pipe 210.

The lever 177 has a transversely projecting lug 222 thereon, which extends into chamber 215 through an opening or slot in the valve casing and which cooperatively engages the end of valve stem 213 to raise valves 209 and 211 to unseated and seated positions, respectively, when lever 177 is raised, by springs 175, from the depressed position shown in Figure 10.

It should now be clear that when the heel of the operator depresses the heel portion of the pedal 193, as it normally does, into the position shown in Figures 2, 11, and 12 and wherein the lever 177 is depressed pivotally about pin 172 until the ends of the prongs 173 engage stops 224 on base 165, the lug 222 on lever 177 is moved away from the end of valve stem 213 so that the spring 216 acts to seat the valve 209, and the force of gravity and fluid pressure in pipe 221 act to unseat valve 211.

The operating mechanisms 41 and 42 being identical, a description of only one is herein given. Referring to Figures 14 to 19, mechanism 41 comprises a base 225 suitably secured to the lower surface of the floor 166, and a housing or cover member 226 suitably secured to the base 225, as by screws or bolts 227. A bracket 228, attached in depending relation to base 225, has a pair of ball bearing members 229 mounted in spaced relation thereon for supporting the horizontally extending shaft 185.

The operating mechanism 41 further comprises a shaft 223 having keyed thereon at one end, within the cover member 226, a pair of cam members 231 and 232 preferbaly formed, as shown, in one piece, the shaft extending upwardly through openings in the base 225 and floor 166 to be suitably joined or coupled at the other end to the operating shaft 123 of brake control device 37, for rotation thereby, as by a connecting shaft 230 and a pair of universal joint couplers 230a. A pair of ball bearing members 233 (Figure 18), mounted in spaced relation on a bracket 240 attached in depending relation to the base 225, serve to support and guide the shaft 223, and a flanged collar 234 screwed to the upper surface of floor 166 covers the annular space around shaft 223 in the opening through the floor 166.

The cam 231 is an operating cam and has a substantially spiral cam surface 235 (Figure 16) which inclines radially outwardly relative to the axis of shaft 223 from a notch 236 therein, the cam surface being cooperatively engaged by a roller 237 on the end of one arm of a bell crank lever 238 pivoted at its fulcrum on a vertically extending pin or shaft 239 mounted on bracket 240. The end of the other arm of the bell crank lever 238 has a roller 241 thereon adapted to engage one end of a lever arm 242, the other end of the arm 242 being pinned or keyed to the inner end of shaft 185. An adjustable screw stop 243 on the free end of arm 242 is engaged by the roller 241 and serves to take up and prevent lost motion of the bell crank lever 238 between the cam 231 and the arm 242.

Normally, with the handle 136 of brake controlling device 37 in release position, the cam 231 is positioned so that roller 237 engages the notch 236. When the handle 136 is turned from release position toward full service position (Figure 6), the cam 231 is correspondingly rotated in a counter-clockwise direction (Figure 16) and the bell crank lever 238 is accordingly rotated about the pin 239 in a clockwise direction, to cause the roller 241 to engage screw stop 243 and rotate arm 242 and consequently shaft 185 in a counter-clockwise direction. (Figure 2.) Rotation of shaft 185 in a counter-clockwise direction operates the lever 47 on the brake controlling device toward application position, through bell crank 184 and cable 49.

Figure 16:
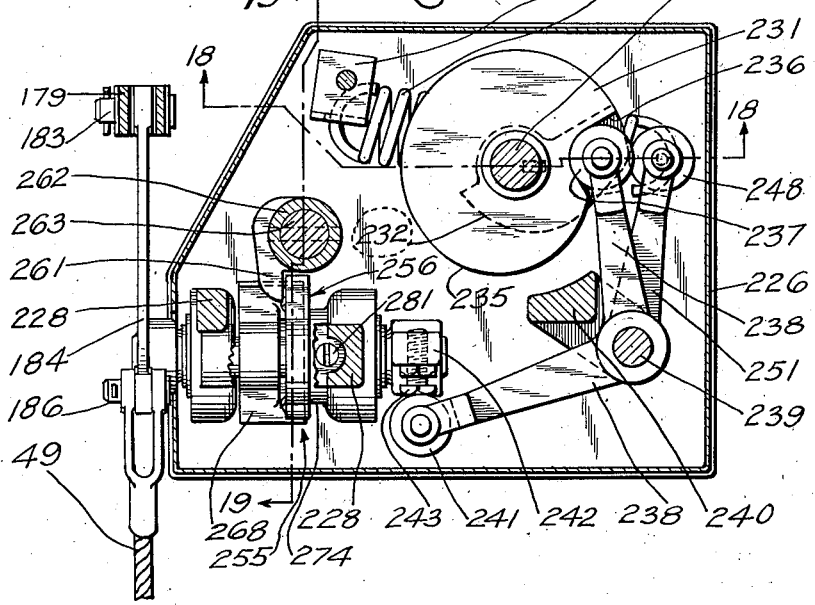

Mechanism is provided for preventing the spring 48 from acting reversely through lever 47, cable 49, bell crank 184, shaft 185, arm 242, bell crank 238, cam 231, and shafts 223 and 123, to return the brake control handle 136 of device 37 to release position from an application position to which it has been moved, even though the hand of operator is taken therefrom or the manually applied force on handle 136 is relieved. This mechanism includes cam 232 having a cam surface 246 thereon of substantially reversely inclined contour relative to the axis of shaft 223 compared to that of the cam surface 235 on cam 231, a roller 248 rotatable on a pin 249 mounted at one end of a lever arm 251, the other end of the lever 251 being pivotally supported on pin 239, and a coil spring 252, secured at opposite ends to a depending bracket 253 (Figures 16 and 18) and pin 249, respectively, for urging the roller 248 into positive engagement with the cam surface 246 of cam 232 and causing a turning movement to be exerted on cam 232 and shaft 223 in a counter-clockwise direction. (Figures 16 and 17.)

The springs 252 and 48 are so suitably designed, in accordance with the length of the various lever arms, and the contours of the cam surfaces on the cams 231 and 232 are so related, that the counter-clockwise turning movement exerted on shaft 223 by spring 252 through cam 232, opposes and substantially balances the clockwise turning moment exerted on shaft 223 by spring 48 through cam 231 in the manner above indicated. Consequently, when the hand of the operator is removed from handle 136, the handle is not returned toward release position but remains in the application position to which it was moved.

Due to the substantially uniform radius of curvature of the cam surface 246 of 232 at the point engaged by roller 248 when handle 136 is in release position, and also to the fact that the line of force exerted by spring 252 on roller 248 is substantially through the axis of shaft 223, spring 252 is ineffective to exert any turning moment on shaft 223 until the cam 231 has been rotated sufficiently to cause roller 237 to move out of the notch 236.

Thus, the handle 136 remains in release position when the pedal 193 of the foot operated brake control device 39 is depressed to effect an application of the brakes, despite the fact that the rotation of shaft 185 incidental to depression of pedal 193 causes rotary movement of the lever arm 242 away from the roller 241 on the bell crank lever 238. Also due to the fact that the turning moment exerted by spring 48 on shaft 223 is unopposed by a turning moment of spring 252 in the release position of handle 136, and due to the relatively steep inclination of the cam surface leading out of the notch 236, a greater manual force is required to turn the handle 136 out of release position than is required to move the handle after it is definitely out of release position. Undesired movement of handle 136 out of release position is thus insured against without sacrificing ease of operation of the handle 136 toward full service position. Clearly, after the handle 136 has been turned out of release position toward full service position, the spring 252 substantially offsets the resistance offered to movement of handle 136 by spring 48 and thus lessens the manual force required to turn the handle 136.

In order to compensate for irregularities in the cam surfaces of cams 231 and 232, as well as for variations in the tension of springs 252 and 48 as they are shortened or lengthened, which factors tend to cause slight unbalances in the opposing turning moments exerted by the springs 48 and 252 on shaft 223, the friction shoe 143, described above in connection with the brake control device 37, is provided for frictionally engaging the friction disc 125 on the operating shaft 123 and thereby resisting and preventing undesired rotary movement of shaft 223. Spring 147 may be adjustably tensioned to vary the friction of the shoe 143 on the disc 125 and thus secure a desired amount of frictional resistance for compensation purposes, by turning the stud bolt 149 in opposite directions.

It is possible to so design the contours of the cam surfaces on cams 231 and 232 relative to each other, that variations in the tension of individual springs 252 and 48 due to changes in the degree of stretching thereof, are automatically compensated for in any position of the cams 231 and 232, in which case the friction shoe 143 might be dispensed with. However, due to tolerances in the commercial manufacture of springs and cams, a perfect balance of turning moments is commercially impracticable and, therefore, I prefer to employ the friction shoe 143.

Referring particularly to Figures 14, 16, and 19, the operating mechanism 41 further comprises an interlocking mechanism 255 for preventing the turning of the handle 74 of door control device 35 to a door opening position until a predetermined brake cylinder pressure has been attained, and also for preventing the release of the brakes while handle 74 is in a door opening position. The interlocking mechanism 255 comprises a locking lever 256 pivotally mounted on shaft 185, the locking lever having a hub or sleeve 257 through which shaft 185 extends, and a pair of oppositely extending arms 258 and 259, preferably integrally joined to the hub 257 and disposed in mutually aligned relation perpendicular to the longitudinal axis of hub 257 and of shaft 185. The arm 259, in the position shown in Figure 19, which is the position occupied thereby when the brakes are released, projects into the path of rotation of a projecting lug 261 on a collar 262 pinned or keyed to one end of a shaft 263, which shaft extends through suitable openings 264 and 265 in the floor 166 and base 225, respectively, and which is suitably joined at the opposite end to the projecting end of the shaft portion 87 of operating member 85 of door control device 35, for rotation thereby, as by a connecting shaft 266 and a pair of universal joint couplers 267. (See Figure 1.)

It should thus be clear that as long as arm 259 blocks rotation of lug 261 and therefore shaft 263, the turning of handle 74 of door control device 35 to a door opening position in a counter-clockwise direction (Figure 3), and consequently opening of a door, is prevented.

Actuating means is provided for rocking the locking lever 256 so that arm 259 moves in a clockwise direction (Figure 19) out of the path of rotation of lug 261 and thus permits turning of shaft 263 and handle 74 of door control device 35 to a door opening position. This actuating means comprises a disc or collar 268 (Figure 14) pinned or keyed to shaft 185 is spaced longitudinal relation to hub 257 of locking lever 256, and having an arcuate projection 269 in spaced concentric relation to shaft 185, the projection 269 extending longitudinally into the path of rotation of arms 258 and 259 of locking lever 256 and adapted to be rotated, upon rotation of shaft 185, so that opposite extremities thereof engage arms 258 and 259, respectively, depending upon the direction of rotation of shaft 185, and cause rocking movement of the locking lever 256 in corresponding directions. Adjustable stop screws 271 and 272, are provided, respectively, at the opposite extremities of the arcuate projections 269, for a purpose that will be made apparent hereinafter.

As shown in Figure 19, the position of the arms 258 and 259 of lever 256 relative to stop screws 271 and 272 is such as to enable the lever 256 to remain in position while the shaft 185 turns relative thereto through a predetermined angle, dependent on the adjustment of the stop screw 271 or 272, before engaging the corresponding arm on the lever 256.

For the purpose of holding the locking lever 256 in position, upon rotation of shaft 185, the hub 257 has a flange 273 thereon adapted to be constantly urged toward the right-hand direction (Figure 14) into frictional contact with a shoulder 274 on bracket 228. The hub 257 extends into and is rotatable in a bore 275 in bracket 228 and has an exterior annular groove 276 thereon which registers with a radial bore 277 opening into bore 275, and a ball 278, which is disposed in bore 277, is urged into such contact with the side surface of the groove 276, by a spring 279 interposed in bore 277 between ball 278 and a set-screw 281 closing the bore 277, that a longitudinal component of force urges the flange 273 into frictional engagement with the shoulder 274. At the same time, undesirable loose movement of the lever 256 longitudinally on shaft 185 is resisted or prevented, especially upon wear of the contacting surfaces of the flange 273 and shoulder 274.

It will now be apparent that upon the rotation of shaft 185 in a clockwise direction from the release position thereof shown in Figure 19, incidentally to effecting an application of the brakes, the shaft 185 first rotates through a predetermined angle relative to and without moving the locking lever 256 until the stop screw 271 engages the arm 258, after which the lever 256 is rocked or moved with the shaft since the frictional force holding lever 256 is overcome. When the shaft 185 rotates further through a sufficient angle, the arm 259 on lever 256 is moved out of the path of movement of the lug 261 of collar 262 on shaft 263 and rotation of the handle 74 of the door control device 35 to a door opening position is accordingly permitted. Since the degree of rotary movement of shaft 185 is a measure of the variation in brake cylinder pressure, it should be clear, therefore, that a predetermined brake cylinder pressure is and must be attained before door opening movement of handle 74 is permitted, upon an application of the brakes.

Furthermore, it should be apparent that adjustment of stop screw 271 toward or away from the arm 258 of lever 256 (Figure 19) decreases or increases, respectively, the degree of rotary movement of shaft 185 required to move arm 259 out of the path of lug 261 and thus permit the handle 74 of door control device 35 to be operated to door opening position, and consequently decreases or increases, respectively, the minimum brake cylinder pressure attainable before door opening movement of handle 74 is permitted.

After an application of the brakes has been effected, and the shaft 185 is rotated back in a counterclockwise direction (Figure 19) incidentally to the release of the brakes, the shaft 185 first rotates relatively to the lever 256 until stop screw 272 engages arm 259, and then rocks lever 256 in a counterclockwise direction. If the handle 74 is in a door opening position, the lug 261 is positioned in the line of rotation of lever 256 and consequently the arm 259 of lever 256 is stopped by lug 261 to prevent further rotation of shaft 185. When handle 74 is turned to door closing position, the lug 261 is rotated out of the path of rotation of lever 256 and then further rotation of shaft 185 in a counterclockwise direction to the position shown in Figure 19 and corresponding to the release position of the brakes, is permitted.

Thus, as long as a door is open, the brakes cannot be released, although the brake cylinder pressure can be reduced in proportion to the degree of counterclockwise rotation of shaft 185 permitted before the arm 259 on lever 256 engages and is stopped by the lug 261.

It should now be clear that, due to the fact that the degree of rotary movement of the shaft 185 in a counterclockwise direction to the point where arm 259 on lever 256 is stopped by lug 261 is greater than the degree of rotary movement of shaft 185 in a clockwise direction from a point where rotation of lug 261 is permitted, by an angle equal to the angular relative movement between the lever 256 and shaft 185, the brake cylinder pressure may be reduced, without closing the doors, to a degree less than the degree required before the doors may be opened.

Furthermore, it should be clear that the stop screw 272 may be adjusted toward or away from the arm 259 of lever 256 to decrease and increase, respectively, the degree of rotation of shaft 185 in a counterclockwise direction, upon release of the brakes, before arm 259 engages and is stopped by lug 261, in order to respectively decrease and increase the degree of reduction in brake cylinder pressure which may be effected, without the handle 74 being operated to close the doors.

It will be observed that an adjustment of stop screw 271 varies only the degree of brake cylinder pressure required to be obtained, upon an application of the brakes, before opening of a door is permitted and does not affect the degree to which brake cylinder pressure may be reduced, upon release of the brakes, and similarly, that an adjustment of stop screw 272 varies only the degree to which brake cylinder pressure may be reduced, upon release of the brakes, without closing the doors and does not affect the degree of brake cylinder pressure required to be obtained, upon an application of the brakes, before opening of a door is permitted.

In operation, with the equipment conditioned as shown in Figure 1, the handle 74 of door control device 35 being in door closing or "handle off" position, the handle 136 of brake control device 37 being in release position, the heel of pedal 193 of foot operated brake control device 39 being in depressed position, the door and brake control devices 36 and 38 being in handle off position with handles removed and the heel of the pedal of the foot operated brake control device 40 being in raised position, the system is charged with fluid under pressure from the main reservoir 30, fluid being supplied to the safety control pipe 62 through pipes 55 and 56, pipe and passage 221, past unseated valve 211 of valve device 208 in foot operated device 39, passage and pipe 210, and double check valve device 29 which is effective to cut off the connection from foot operated device 40 to the safety control pipe 62. Fluid under pressure also flows from pipe 56 to chamber 153 of sanding valve device 151 in the brake control device 37 and to the corresponding chamber in brake control device 38.

As previously indicated, the automatic sanding valve device 34 is conditioned to supply fluid under pressure from the main reservoir 30 to the sanding reservoir 31, whence fluid under pressure is supplied to the various door engine devices (not shown) through pipes 117 and 118 and to the door engines for the first and second doors controlled by the door control device 35, through pipe 115, pipe and passage 116, chamber 72 and port 111 in rotary valve 73 of control device 35, and in pipes 112 and 113, respectively, and in a similar manner to the door engines for the first and second doors controlled by the door control device 36.

With the system charged with fluid under pressure as just described, and with the car in motion, a service application of the brakes may be made by the operator depressing the toe of the pedal 193 of control device 39, without however raising the heel of pedal 193, the operating arm 47 on brake controlling valve device 33 being accordingly turned, as previously explained, in a clockwise direction to operate the valve device 33 to cause fluid under pressure to be supplied to the brake cylinder 32 to effect an application of the brakes. A graduated application of the brakes may be made by the operator depressing the toe of the pedal 193 in successive steps until a full service application of the brakes is obtained.

To release the brakes, the operator relieves the pressure applied to the toe of pedal 193, and the lever 47 is accordingly returned counterclockwise toward release position by spring 48 to reduce the brake cylinder pressure in accordance with the degree of movement of arm 47, the pedal 193 being automatically also returned by spring 48 which exerts a reverse pull on cable 49 to cause the bell crank 184 to rock in a clockwise direction and return the rod 179 upwardly. Graduated release of the brakes may be effected by relieving in successive steps the pressure applied to the toe portion of pedal 193, full release of the brakes being obtained when the toe portion of the pedal 193 is returned to the fully raised position shown in Figure 1.

In the event that the operator desires to stand while running the car, in order that he may more readily observe clearances in traffic congested areas, the hand operated brake control device 37 may be employed in effecting and releasing service applications of the brakes. It is, however, necessary that the heel portion of pedal 193 be maintained depressed, as will appear hereinafter.

In effecting a service application of the brakes by means of the control device 37, the operator turns the handle 136 toward full service position, rotation of shaft 185 and bell crank lever 184 in a counterclockwise direction (Figure 1) being accordingly effected through operating mechanism 41 so that the lever 47 of the brake controlling device 33 is rotated clockwise to effect a service application of the brakes, the degree of brake cylinder pressure attained being proportional to the degree of turning movement of handle 136. If for some reason, the operator finds it necessary to remove his hand from the handle 136, he may do so, the operating mechanism 41 being effective to maintain the handle 136 in the position to which it was moved. A graduated service application of the brakes may be made by turning the handle 136 toward full service position (Figure 7) in successive steps, a full service application of the brakes being obtained when the handle 136 reaches full service position.

Release of the brakes, after a service application of the brakes has been made by means of the control device 37, is effected by returning the handle 136 toward release position, in which case, the spring 48 acts reversely through cable 49, bell crank 184, shaft 185, and arm 242, to cause the bell crank 238 of operating mechanism 41 to follow the return movement of cam 231 toward release position. Graduated release of the brakes may be effected by returning the handle 136 toward release position in successive steps, full release of the brakes being effected when handle 136 reaches release position.

It will be seen that the hand operated brake control device 37 is a means for preventing return of the toe portion of pedal 193 to release position when the pressure thereon is relieved after being depressed, for upon turning of the handle 136 of device 37 sufficiently to cause the roller 241 on bell crank 238 to engage the lever arm 242, on shaft 185, return movement of shaft 185 and of the toe portion of foot pedal 193 to release position is prevented by the part of operating mechanism 41 which holds handle 136 in an application position.

Sanding may be effected at any time, and whether foot operated device 39 or hand operated device 37 is employed in effecting a service application of the brakes, by depressing the end of the handle 136 of device 37 to unseat valve 152 and supply fluid under pressure from the main reservoir 30 to the sanding device 43, as previously described. Upon the return of handle 136 to its raised position shown in Figure 2, valve 152 is reseated to cut off further supply of fluid under pressure to the sanding device 43.

In the event that the operator desires to bring the car to a stop and open the doors, the operating mechanism 41 insures the fact that a predetermined brake cylinder pressure, such as thirty-five pounds, adequate to bring the car to a stop has first been attained before permitting the handle 74 of door control device 35 to be turned to a door opening position. Assuming that the operator has caused the brakes to be applied with a force adequate to bring the car to a stop, and has turned the handle 74 of the door control device to one of the door opening positions, it is not necessary that the brake cylinder pressure be maintained at the high degree required before door opening operation of handle 74 is permitted, because operating mechanism 41 is effective, as hereinbefore described, to permit a reduction in brake cylinder pressure, that is a graduating off of the brakes, to a point sufficient to hold the car at rest, even with the handle 74 in a door opening position. For example, the operating mechanism 41 may permit a reduction in brake cylinder pressure to ten or even five pounds, the particular minimum limit of brake cylinder pressure being selected in accordance with grade conditions of service, and the screw 272 of the operating mechanism 41 adjusted to establish the selected limit of brake cylinder pressure.

This feature of my invention is of particular advantage, for due to the comparatively low brake cylinder pressure permitted while the control handle 74 is in a door opening position, the time required to vent the brake cylinder and fully release the brakes and, therefore, to accelerate the car from rest, is reduced as compared to that required in systems or equipments which cause a comparatively high brake cylinder pressure or a full service application of the brakes to be maintained as long as a door is open or a door control handle in a door opening position.

If the operator has effected an application of the brakes by means of the foot pedal 193, the full release of the brakes will be effected automatically, if no pressure is maintained on the toe portion of pedal 193, merely upon the return of handle 74 of door control device 35 to door closing position, because once the lug 261 of the interlocking mechanism 255 of operating mechanism 41 frees the locking lever 256, the spring 48 is effective to cause lever arm 47 to be returned to full release position since rotation of shaft 185 to release position is permitted.

If the hand operated control device 37 has been employed to effect the application of the brakes, it is necessary that the handle 136 be manually returned to full release position in order to effect full release of the brakes, since as previously described, the operating mechanism 41 is effective to prevent automatic return of handle 136 to release position, and freeing of lever 256 and shaft 185 for return movement by return of the handle 74 to door closing position, cannot, therefore, result in automatic release of the brakes.

In like manner, as above described, the brake, door and sand control operations may be effected by means of the hand operated brake control device 38, the foot operated device 40, and the door control device 36 at the opposite end of the car.

Should the operator become incapacitated or for some other reason relieve the pressure which he normally applies to depress the heel portion of pedal 193 of foot operated device 39, a "dead man's" or safety control emergency application of the brakes is automatically initiated, the fluid pressure acting on the door engines for the various doors is automatically balanced to permit of their being manually opened, and sanding at both ends of the car is effected.

Upon the relief of pressure on the heel portion of pedal 193, the springs 175 automatically raise the lever 171 of the control device 39 pivotally about the pin 172 and thus the lug 222 raises the valves 209 and 211 of valve device 208 to unseated and seated positions, respectively, the normal supply of fluid under pressure from main reservoir 30 to the fluid pressure actuated piston device in casing section 61 of brake controlling device 33 being thus cut off by valve 211, and venting of the fluid under pressure therefrom to atmosphere effected through safety control pipe 62, double check valve 29, pipe and passage 210, past unseated valve 209, and bore 214.

The brake controlling device 33 is accordingly automatically actuated by the fluid pressure actuated piston device in casing section 61 thereof, to effect an emergency application of the brakes, fluid under pressure being simultaneously supplied to the automatic sanding valve device 34 from the main reservoir through pipe 66, as before described.

The valve device 34 is accordingly operated to establish communication from sanding reservoir 31 to pipe 68, as before described, and thus fluid under pressure is supplied from reservoir 31 and in opposite directions through pipe 68 and non-return check valve devices 45 and 46 to the sanding devices 43 and 44, at opposite ends of the car respectively.

With the door control devices 35 and 36 conditioned in door closing or handle off positions, the fluid under pressure normally supplied under the control thereof and through pipes 112 and 113 to the door engines for the first and second doors, as well as the fluid under pressure normally supplied to all the door engines through pipes 117 and 118, is vented through the sanding reservoir 31 and the sanding devices 43 and 44, so that the fluid pressures acting on the door engines are balanced at atmospheric pressure to permit the doors to be manually opened.

Upon reapplication of pressure to depress the heel portion of the pedal 193, valve device 208 is again operated to the position shown in Figure 10, wherein fluid under pressure is again supplied from the main reservoir 30 to the fluid pressure actuated piston device in casing section 61 of brake controlling device 33, and the venting of fluid under pressure therefrom cut off. The brake controlling device 33 is accordingly operated to release position and full release of the brakes is effected. Fluid under pressure is also vented to atmosphere from the actuating piston of the automatic sanding valve device 34, under the control of the valve operated by the fluid pressure actuated piston device of the brake control device 33, and the valve device 34 is accordingly operated to its position for effecting charging of the system, as before described.

It should be understood that the brake controlling valve device 33 includes an interlocking mechanism (not shown) as disclosed and claimed in the above-mentioned copending application, Serial No. 698,243, for locking the fluid pressure actuated piston device therein against movement and thereby preventing it from operating the brake controlling device 33 to effect an emergency application of the brakes, as long as the brake cylinder pressure exceeds a predetermined degree, such as thirty-five pounds, adequate to bring the car to rest. Such interlocking mechanism accordingly permits the pressure normally applied to depress the heel portion of pedal 193 to be relieved, after a predetermined brake cylinder pressure is attained in effecting a service application, without a dead man's emergency application of the brakes as before described, being effected. Such interlocking mechanism further prevents the operation of the brake controlling device 33 to release position to effect release of the service application, as long as the heel portion of pedal 193 remains undepressed.

As shown in Figures 20 to 24, a modification of the apparatus shown in Figure 1 may be provided, wherein the hand operated brake and sanding control device 37 is omitted, and wherein a door and sanding control device 285 and an operating mechanism 286 are substituted for the door control device 35 and the operating mechanism 41, respectively.

The control device 285 is substantially the same as the door control device 35 with the exception that the casing thereof is such as to embody a sanding control valve device 287. The valve device 287 comprises a valve 288 for controlling the supply of fluid under pressure from a chamber 289, connected to rotary valve chamber 72 and to passage and pipe 116 leading to the sanding reservoir 31, to an annular chamber 291 connected to the sanding device 43 through passage and pipe 155. Valve 288 is normally yieldingly urged into seated position cutting off the connection between pipe 116 and pipe 155 by a spring 292 interposed between the valve 288 and the casing and is adapted to be unseated to open the communication between pipe 116 and pipe 155, by depressing the outer end of an operating stem 293, which projects exteriorly of the upper face of the casing, the inner fluted end of the stem 293 engaging the end of the fluted stem 294 of the valve.

Means is provided for depressing the projecting end of the stem 293, which comprises a semicircular bail 295 having a tongue 296 at the midpoint thereof pivotally mounted on the casing, by means of a yoke 297 formed on or secured to the casing and a pin 298, in such manner that the curved ends of the bail 295 extend closely around opposite sides of the upper neck or sleeve portion 77 of the casing and that the lower surface of the bail adjacent the tongue 296 rests on the projecting end of the operating stem 293. A depressible cap member 299 mounted on the outside of the socket portion 301 of the operating handle 302 is adapted to engage the ends of the bail 295 and thus depress the bail to effect unseating of valve 288. As shown in Figure 22, the socket portion 301 of the operating handle has an annular groove 303 in the upper closed end thereof for receiving one end of a coil spring 304, which is interposed between the handle 302 and the interior surface of the cap member 299 for normally yieldingly urging the cap member upwardly to the position shown. The cap member 299 may be secured to the socket portion 301 of the handle 302 in any suitable manner, as for example that shown in Figure 23, wherein a plurality of tongues 305, each severed on three sides thereof from the wall of the cap member, are bent inwardly into an annular groove 306 on the outside of the socket portion of the handle 302, so that the free end of the tongues engages the side of the groove in interlocking relation to limit the upward movement of the cap member.

The operating mechanism 286 is similar in structure to the operating mechanism 41 and differs essentially therefrom in embodying only the interlocking mechanism 255 of the mechanism 41. It is deemed unnecessary, therefore, to specifically describe operating mechanism 286, except to explain that corresponding parts in the two mechanisms 41 and 286 are identified by the same reference numerals, and to point out that an end collar 307 suitably secured to the inner end of shaft 185 is substituted for the lever arm 242.

In operation, the modified system of Figures 20 to 24 functions as does the system previously described, except of course that sanding is effected by depressing the cap member 299 on the door control device 285 and that the brakes cannot be operated by hand control. It should be noted, however, that the supply of fluid under pressure to the sanding device 43 is from sanding reservoir 31 for both manual and automatic operations instead of from the main reservoir 30 for manual operation and from sanding reservoir 31 for automatic operation, as in the previous system. In view of the fact, however, that the automatic sanding valve device 34 normally supplies fluid under pressure to the sanding reservoir 31 from main reservoir 30, the simultaneous reduction, if any, in the pressure of fluid acting on the door engine devices, effected by reverse flow of fluid under pressure through pipes 112, 113 and 117, and through the sanding device 43, upon unseating of sanding control valve 288, is not sufficient to permit the doors to be manually opened.

As shown in Figures 25 and 26, another modification of the apparatus shown in Figure 1 may be provided, wherein the hand operated brake and sanding control device 37 and the operating mechanism 41 are omitted, while a door control device 308 similar to the door control device 35 is provided, as well as a separate manually operable sanding valve device 309 of any suitable type.

The door control device 308 is the same as door control device 35 except that the shaft portion 87 of the operating member 85 is cut off and does not extend outside the casing, the lowermost section or pipe bracket 311 of the casing accordingly not having an opening therethrough to permit the shaft portion 87 to extend to the exterior of the casing.

The sanding valve device 309 may comprise any suitable type of valve which is normally yieldingly held in position to close communication between pipe 56 and pipe 155 and which is adapted to open the communication therebetween to supply fluid under pressure from the main reservoir 30 to the sanding device 43 upon the depressing of the operating button 312 thereof.

In view of the absence of operating mechanism 41, a bell crank lever 313 is provided, which functions as does the bell crank lever 184, to operatively connect the lower end of the operating rod 179 of the foot operated brake control device 39 to the end of the operating cable 49, and which is pivotally mounted on a bracket 314 secured in depending relation to the lower surface of the car floor 166 as by a plurality of screws or bolts 315.

The bracket 314 has a pair of spaced arms 316 for supporting a pin 317, the bell crank lever 313 being suitably pivoted on the pin 317 as by a ball bearing member 318, interposed between the bell crank and the pin and secured within an opening 319 in the bell crank lever. Spacing collars 321 may be provided on opposite sides of the bell crank lever for centering the bell crank between the arms 316 and keeping it out of contact with the arms. The pin 317 may be secured in place by a pin 322 extending through one collar 321 and the pin 317. A pair of cover plates 323 may also be provided, as shown, secured on opposite sides respectively of the bell crank lever 313, as by bolts 324, for keeping dirt and dust particles from the bearing member 318.

Except in the respects noted, the parts of the apparatus shown in Figures 25 and 26 are the same as the first described embodiment of my invention and the same identifying numerals are accordingly employed. In view of the previous description of the structure and operation of the first embodiment, the operation of the embodiment shown in Figures 25 and 26 should be clear without further explanation.

Figure 27:
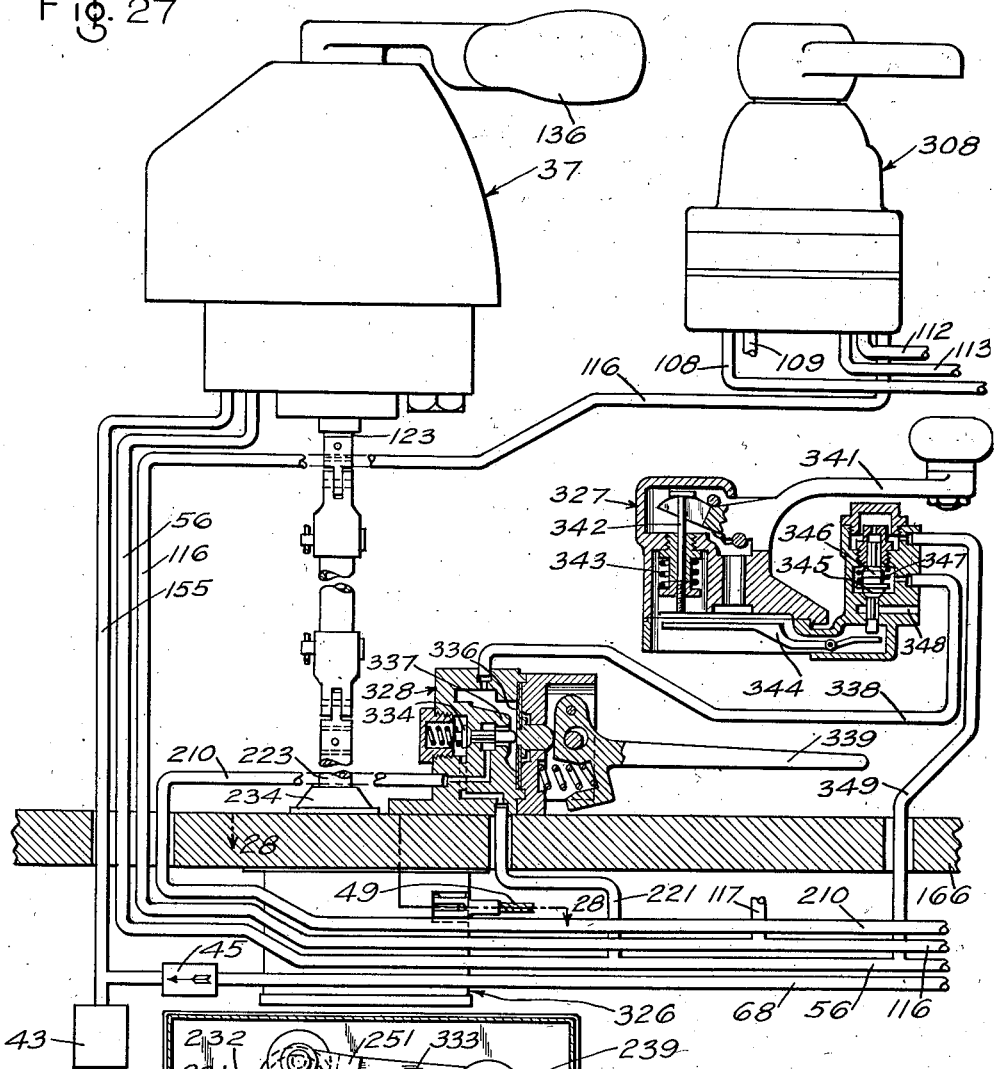
Figure 27 is an enlarged fragmentary elevational view, partly in section of a further modification of the equipment shown in Figure 1.
Figure 28:
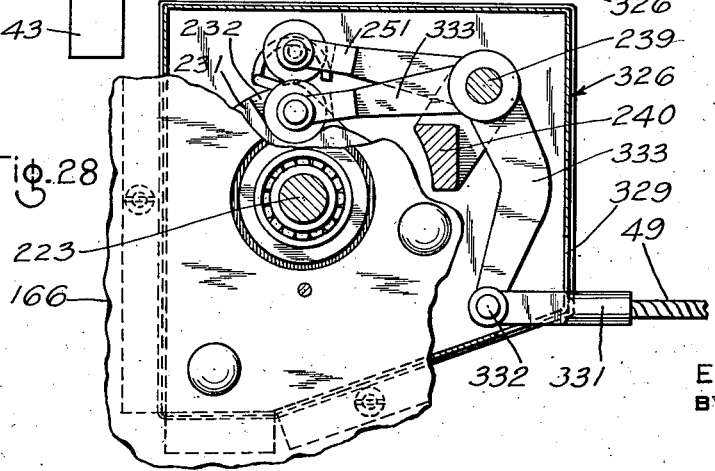
Figure 28 is a sectional view, partly broken away, taken on line 28—28 of Figure 27.

As shown in Figures 27 and 28, a further modification of the apparatus shown in Figure 1, may be provided, wherein the foot operated brake control device 39 is omitted, wherein the door control device 308 employed in the embodiment shown in Figure 25 is substituted for the door control device 35, wherein an operating mechanism 326 is substituted for the operating mechanism 41, and wherein a car motor-controller valve device 327 and a foot operated valve device 328 are employed to secure the dead man's emergency feature provided by the foot operated device 39.

The operating mechanism 326 is substantially the same as the operating mechanism 41 except that the interlocking mechanism 255 of the latter is not included therein, there being thus no interlock between the door control device 308 and the brake controlling valve device 33. The casing of mechanism 326 is of smaller size than the casing of the operating mechanism 41 and has an opening 329 at the side thereof through which the cable 49 extends, the end of the cable being pivotally connected, as by a clevis 331 and pin 332 to the end of the arm of a bell crank lever 333 corresponding to the end of the arm of bell crank lever 233 of operating mechanism 41 that cooperates with the lever arm 242. Thus upon rotation of the handle 136 of the brake and sanding control device 37 toward full service position, the cable 49 is pulled to the left in Figure 28 to cause clockwise movement (Figure 1) of operating lever 47 of the brake controlling valve device 33 to effect an application of the brakes. It will be understood, of course, that the mechanism 326 functions, as does the corresponding part of operating mechanism 41 to hold the handle 136 of the brake control device 37 in an application position without its being returned to release position when the hand of the operator is removed therefrom.

The foot operated valve device 328 is of standard construction and thus requires but brief description herein. It comprises a valve 334 effective in seated and unseated positions to close and open, respectively, communication between pipe 221 leading to main reservoir pipe 56 and pipe 210 leading to safety control pipe 62, and a diaphragm valve 336 cooperating with an annular rib seat 337 to open and close the connection between pipe 221 and a pipe 338 leading to the controller device 327, the valves 334 and 336 being oppositely seated and operated simultaneously by a foot pedal 339.

The controller device 327 is also of standard construction and likewise requires but brief description herein. The removable handle 341 of the controller device, when in the normal depressed position thereof, as shown, raises a plunger rod 342 against the force of a spring 343, a pivoted lever 34 being thus rocked in a clockwise direction to permit a pair of oppositely seating valves 345 and 346 to be seated and unseated, respectively, by a spring 347. The valve 345 is effective in the seated and unseated positions thereof to close and open, respectively, communication between pipe 338 and an atmospheric passage 348, and valve 346 is effective in the seated and unseated positions thereof to close and open, respectively, communication between pipe 338 and a pipe 349 opening into the main reservoir pipe 56.

When the handle 341 of the controller device 327 is released, the spring 343 moves the plunger rod 342 downwardly to cause it to engage and rock one end of the lever 344 counterclockwise, whereby the opposite ends of the lever simultaneously moves the valves 345 and 346 to unseated and seated positions, respectively, against the force of spring 347.

The operation of the system shown in Figures 27 and 28 is the same as that previously described in connection with the embodiment shown in Figure 1, except in respect to the omitted parts and in respect to the operation and function of the controller device 327 and foot valve device 328, so that a brief explanation as to the operation of the controller device 327 and the foot valve device 328 should suffice to render the entire operation understandable.

With the handle 341 of controller device 327 in its normal depressed condition while the car is running along the road and with the pedal 339 of the foot valve device in its raised position, fluid under pressure is supplied from the main reservoir 30 (Figure 1) to the safety control pipe 62, through pipes 56 and 349, past the unseated valve 346, through pipe 338, and past unseated diaphragm valve 336, and pipe 210. If the handle 341 is released, as upon incapacitation of the operator or for any other reason, the valves 345 and 346 are operated so as to cut off the supply of fluid under pressure to the safety control pipe 62 and to connect the safety control pipe to atmosphere to cause a dead man's emergency application of the brakes to be effected, as before described.

The handle 341 may be released without effecting a dead man's emergency application of the brakes, if the pedal 339 of foot valve device 328 is depressed before the handle 341 is released. When the pedal 339 is depressed, the diaphragm valve 336 is seated to cut off the atmospheric connection of safety control pipe 62 through pipes 210 and 338, and passage 348 of the controller device, while the valve 334 is unseated to cause the supply of fluid under pressure from main reservoir 30 to the safety control pipe 62 to be maintained through pipe and passage 221, past the unseated valve 334, and through pipe 210.

It will therefore be seen that I have disclosed safety car equipment including an improved door control device, an improved combined door control and sanding valve device, an improved hand operated brake and sanding control device, an improved foot operated service and dead man's emergency brake control device, and novel mechanism for associating a hand operated brake control device and a foot operated brake control device to provide optional operation thereby of a brake controlling valve device, and for interlocking the valve device with a door control device. This mechanism, it will be understood, comprises two parts separately or jointly employable, one part for causing the handle of the hand operated brake control device to remain unmoved in an application position, notwithstanding that movement thereof into application position is yieldingly resisted and that the hand of the operator is removed from the handle, and the other part for so interlocking either the hand operated brake control device or the foot operated brake control device or both together with a door control device, that operation of the door control device to effect opening of any door is prevented unless a predetermined brake cylinder pressure has been obtained by operation of said control devices, and that release of the brakes is prevented unless the door control device is operated to effect closing of all doors. It will be recalled, however, that upon release of the brakes, the interlocking part of the mechanism enables the brake cylinder pressure to be reduced to a predetermined pressure less than the pressure, required to be attained before a door may be opened, without necessitating the closing of the doors. The interlocking mechanism is also adjustable to vary either one or both of the predetermined brake cylinder pressures, above mentioned.

While only four embodiments of my invention have been disclosed, it should be understood that various other arrangements or combinations of the constituent elements thereof, as well as various omissions, additions, or changes in the structure and operation of the constituent elements, may be made without departing from the spirit of my invention. It is not my intention, therefore, to limit my invention except as necessitated by the prior art and as defined in the appended claims.

Having now described my invention, what I claim as new and desire to secure by Letters Patent, is:

1. In a brake and door control apparatus, in combintion, means operative manually to control the brakes, means operative manually to control the doors, and means effective, when the door control means is in door opening position, to permit operation of the brake control means to reduce the degree of application of the brakes after operation thereof to effect an application of the brakes but preventing operation of the brake control means to effect release of the brakes.

2. In a brake and door control apparatus, in combination, means operative manually to control the brakes, means operative manually to control the doors, and means effective, when the door control means is in door opening position, to permit operation of the brake control means to reduce the application of the brakes to a certain minimum degree after operation thereof to effect an application of the brakes but preventing operation of the brake control means to effect release of the brakes.

3. In a brake and door control apparatus, in combination, means operative manually to control the brakes, means operative manually to control the doors, and means effective to prevent operation of the door control means to door opening position unless the brake control means has been operated to effect at least a certain minimum degree of application of the brakes and effective when said door control means is in door opening position, to prevent operation of said brake control means to release the brakes.

4. In a brake and door control apparatus, in combination, means operative manually to control the brakes, means operative manually to control the doors, and means effective to prevent operation of the door control means to door opening position unless the brake control means has been operated to effect at least a certain minimum degree of application of the brakes and effective when said door control means is in door opening position, to permit operation of said brake control means to reduce the degree of application of the brakes but preventing operation of said brake control means to release the brakes.

5. In a brake and door control apparatus, in combination, means operative manually to control the brakes, means operative manually to control the doors, and means effective to prevent operation of the door control means to door opening position unless the brake control means has been operated to effect at least a certain minimum degree of application of the brakes and effective when said door control means is in door opening position, to permit operation of said brake control means to reduce application of the brakes to a second certain minimum degree but preventing operation of said brake control means to release the brakes.

6. In a brake and door control apparatus, in combination, means operative manually to control the brakes, means operative manually to control the doors, and means effective to prevent operation of the door control means to door opening position unless the brake control means has been operated to effect at least a certain minimum degree of application of the brakes and effective when said door control means is in door opening position, to permit operation of said brake control means to reduce application of the brakes to a uniform minimum degree substantially less than said certain minimum degree but preventing operation of said brake control means to release the brakes.

7. In a brake and door control apparatus, in combination, means operative manually to control the brakes, means operative manually to control the doors, means effective, when the door control means is in door opening position, to permit operation of the brake control means to reduce the application of the brakes to a certain minimum degree after operation thereof to effect an application of the brakes but preventing operation of the brake control means to effect release of the brakes, and adjustable means for varying the said certain minimum degree of application of the brakes.

8. In a brake and door control apparatus, in combination, means operative manually to control the brakes, means operative manually to control the doors, means effective, when the door control means is in door opening position, to permit operation of the brake control means to reduce the application of the brakes to a certain minimum degree after operation thereof to effect an application of the brakes but preventing operation of the brake control means to effect release of the brakes, and means for conditioning the last said means to vary the said certain minimum degree of application of the brakes.

9. In a brake and door control apparatus, in combination, means operative manually to control the brakes, means operative manually to control the doors, means effective to prevent operation of the door control means to door opening position unless the brake control means has been operated to effect at least a certain minimum degree of application of the brakes and effective when said door control means is in door opening position, to permit operation of said brake control means to reduce application of the brakes to a second certain minimum degree but preventing operation of said brake control means to release the brakes, and adjustable means for varying either or both of the two said certain minimum degrees of application of the brakes.

10. In a brake and door control apparatus, in combination, means operative manually to control the brakes, means operative manually to control the doors, means effective to prevent operation of the door control means to door opening position unless the brake control means has been operated to effect at least a certain minimum degree of application of the brakes and effective when said door control means is in door opening position, to permit operation of said brake control means to reduce application of the brakes to a second certain minimum degree but preventing operation of said brake control means to release the brakes, and means for conditioning the last said means to vary either or both of the two said certain minimum degrees of application of the brakes.

11. In a brake and door control apparatus, in combination, means operative manually to effect application of the brakes to a degree in accordance with the degree of movement thereof out of its normal release position, means operative manually to door opening position from a normal door closing position thereof, means movable with the brake application means, and means movable with the door control means, the last two means being so relatively arranged that they move in intersecting paths, the former of the two means being in the path of the latter to prevent operation of the door control means to door opening position until said brake application means has moved a certain uniform degree from its release position, and the latter being in the path of the former when the door control means is in door opening position, to prevent return movement of the former and of the brake application means to the release position thereof.

12. In a brake and door control apparatus, in combination, means operative manually to effect application of the brakes to a degree in accordance with the degree of movement thereof out of a normal release position thereof, means operative to control the doors, means normally in a position to prevent operation of the door control means to door opening position, and means movable in accordance with the operative movement of the brake application means, adapted upon operation of the brake application means to effect an application of the brakes, to move first a uniform degree relative to the preventing means and then to engage and move the preventing means, said preventing means being rendered ineffective to prevent operation of the door control means to door opening position upon at least a certain uniform degree of movement thereof by said last means.

13. In a brake and door control apparatus, in combination, means operative manually to effect application of the brakes to a degree in accordance with the degree of movement thereof out of a normal release position thereof, means operative to control the doors, means normally in a position to prevent operation of the door control means to door opening position, means movable in accordance with the operative movement of the brake application means adapted upon operation of the brake application means to effect an application of the brakes, to move first a uniform degree relative to the preventing means and then to engage and move the preventing means, said preventing means being rendered ineffective to prevent operation of the door control means to door opening position upon at least a certain uniform degree of movement thereof by said last means, and means for varying the degree of movement of the said last means relative to the preventing means before engaging the preventing means upon an application of the brakes, and thereby varying the total minimum degree of movement of said last means required to so move the said preventing means as to render it ineffective to prevent operation of the door control means to door opening position.

14. In a brake and door control apparatus, in combination, means operative manually to effect application of the brakes to a degree in accordance with the degree of movement thereof out of a normal release position thereof, means operative to control the doors, means normally in a position to prevent operation of the door control means to door opening position, and means movable in accordance with the operative movement of the brake application means, adapted upon operation of the brake application means to effect an application of the brakes, to move first a uniform degree relative to the preventing means and then to engage and move the preventing means, said preventing means being rendered ineffective to prevent operation of the door control means to door opening position upon at least a certain uniform degree of movement thereof by said last means, said last means being adapted upon reverse movement of said brake application means toward its release position, to move first a uniform degree relative to the preventing means and then to engage and return said preventing means toward its normal position.

15. In a brake and door control apparatus, in combination, means operative manually to effect application of the brakes to a degree in accordance with the degree of movement thereof out of a normal release position thereof, means operative to control the doors, means normally in a position to prevent operation of the door control means to door opening position, and means movable in accordance with the operative movement of the brake application means, adapted upon operation of the brake application means to effect an application of the brakes, to move first a uniform degree relative to the preventing means and then to engage and move the preventing means, said preventing means being rendered ineffective to prevent operation of the door control means to door opening position upon at least a certain uniform degree of movement thereof by said last means, said last means being adapted upon reverse movement of said brake application means toward its release position, to move first a uniform degree relative to the preventing means and then to engage and return said preventing means toward its normal position, and said door control means being adapted when in door opening position to prevent return of said preventing means into its normal position.

16. In a brake and door control apparatus, in combination, means operative manually to effect application of the brakes to a degree in accordance with the degree of movement thereof out of its normal release position, means operative manually to control the doors, a shaft rotatable according to the operative movement of the brake application means, means loosely mounted on said shaft and normally in a position to prevent operation of the door control means to door opening position, and means secured to the shaft and adapted upon rotation of the shaft when an application of the brakes is effected, to rotate relative to said loosely mounted means for a uniform degree, and then engage and move the loosely mounted means out of its normal position to permit operation of the door control means to door opening position.

17. In a brake and door control apparatus, in combination, means operative manually to effect application of the brakes to a degree in accordance with the degree of movement thereof out of its normal release position, means operative manually to control the doors, a shaft rotatable according to the operative movement of the brake application means, means loosely mounted on said shaft and normally in a position to prevent operation of the door control means to door opening position, means for frictionally resisting movement of said loosely mounted means out of position, and means secured to the shaft and adapted upon rotation of the shaft when an application of the brakes is effected, to rotate relative to said loosely mounted means for a uniform degree, and then engage and move the loosely mounted means, against the resistance of the said frictionally resisting means, out of its normal position to permit operation of the door control means to door opening position.

18. In a brake and door control apparatus, in combination, means operative manually to effect application of the brakes to a degree in accordance with the degree of movement thereof out of its normal release position, means operative manually to control the doors, a shaft rotatable according to the operative movement of the brake application means, a second shaft rotatable according to the operative movement of the door control means, means secured on said second shaft, means loosely mounted on said first shaft and normally in a position across the path of rotation of the said means on said second shaft to prevent operative movement of the door control means to door opening position, means secured on the said first shaft adapted to move relative to the loosely mounted means for a uniform degree and then engage and move the loosely mounted means out of the path of the means on said second shaft to permit operative movement of the door control means to door opening position.

19. In a fluid pressure brake, in combination, a brake controlling valve device operative from a normal release position thereof to effect application of the brakes, resilient means yieldingly resisting operation of the valve device from its release position and tending to return it to release position, means manually movable from a normal position thereof corresponding to the release position of the valve device for effecting operation of the valve device to effect application of the brakes, said resilient means tending to return said manually movable means toward its normal position upon relief of pressure manually applied to the manually movable means, and a second resilient means effective to substantially oppose the force of the first resilient means when the manually movable means is out of its normal position so that upon relief of force manually applied to the manually movable means the manually movable means remains stationary.

20. In a fluid pressure brake, in combination, a brake controlling valve device operative from a normal release position thereof to effect application of the brakes, resilient means yieldingly resisting operation of the valve device from its release position and tending to return it to release position, means manually movable from a normal position thereof corresponding to the release position of the valve device for effecting operation of the valve device to effect application of the brakes, said resilient means tending to return said manually operative means toward its normal position upon relief of pressure manually applied to the manually movable means, a second resilient means effective to substantially oppose the force of the first resilient means when the manually movable means is out of its normal position so that upon relief of force manually applied to the manually movable means the manually movable means remains stationary, and means frictionally resisting movement of the manually movable means to compensate for possible differences in the opposing forces of the two resilient means.

21. In a fluid pressure brake, in combination, a brake controlling valve device operative from a normal release position thereof to effect application of the brakes, resilient means yieldingly resisting operation of the valve device from its release position and tending to return it to release position, means manually movable from a normal position thereof corresponding to the release position of the valve device for effecting operation of the valve device to effect application of the brakes, said resilient means tending to return said manually operative means toward its normal position upon relief of pressure manually applied to the manually movable means, and means for preventing said resilient means from returning the manually movable means toward its normal position when the manual force which was applied to move the manually operative means out of its normal position is relieved, said last means including a second resilient means effective to substantially oppose the force of the first resilient means.

22. In a fluid pressure brake, in combination, a brake controlling valve device operative from a normal release position thereof to effect application of the brakes, resilient means yieldingly resisting operation of the valve device from its release position and tending to return it to release position, a shaft manually rotatable from a normal position corresponding to the release position of the valve device for effecting operation of the valve device to effect application of the brakes, said resilient means being adapted to exert a turning movement on said shaft tending to return it toward its normal position upon relief of force manually applied to rotate the shaft, and a second resilient means adapted to exert a turning movement on the said shaft in opposition to and substantially balancing that exerted on the shaft by the first resilient means so that upon relief of the force manually applied to the shaft, the shaft remains stationary.

23. In a fluid pressure brake, in combination, a pair of cams manually rotatable together away from a normal position thereof, means moved by one of said cams upon rotation of the cams away from the normal position thereof, for effecting application of the brakes, resilient means resisting movement of said means by said one cam and exerting a turning moment through said means on said one cam tending to return the cams toward the normal position thereof, and means for holding said cams stationary out of their normal position, including resilient means cooperating with the other of said cams to exert a turning moment on said shaft opposing and substantially balancing the turning moment exerted by the first said resilient means.

24. In a fluid pressure brake, in combination, a manually rotatable shaft having a normal position in which the brakes are released and rotatable away from its normal position to effect application of the brakes, resilient means adapted to exert a turning moment on said shaft tending to resist rotation of said shaft away from its normal position and tending to return the shaft toward its normal position, means effective to exert a turning moment on said shaft in opposition to and substantially balancing the turning moment exerted on said shaft by said resilient means, for holding said shaft stationary out of its normal position, and means controlled by rotation of said shaft for rendering said last means effective to exert a turning moment on said shaft only when said shaft is out of its normal position.

25. In a brake and door control apparatus, in combination, a brake controlling valve device operative to effect application and release of the brakes, foot operated means for operating said valve device, hand operated means for also operating said valve device, means manually operative to control the doors, means movable in accordance with the operative movement of either the foot operated means or the hand operated means, and means effective or ineffective to prevent operative movement of the door control means to door opening position subject to the movement of the last said means.

26. In a brake and door control apparatus, in combination, a brake controlling valve device operative to effect application and release of the brakes, foot operated means for operating said valve device, hand operated means for also operating said valve device, means manually operative to control the doors, means movable in accordance with the operative movement of either the foot operated means or the hand operated means, and means normally in a position to prevent operative movement of the door control means to door opening position and adapted to be moved by said last means to a position wherein it permits operative movement of the door control means to door opening position.

27. In a brake control apparatus, in combination, means operative manually out of a normal release position to effect application of the brakes, means yieldingly opposing operative movement of the manually operative means out of release position and tending to return it toward release position upon relief of force manually applied to move the manually operative means, a second manually operative means adapted to remain in a normal release position upon operation of said first manually operative means to effect an application of the brakes, and effective upon operation out of its normal position to cause said first manually operative means to be operated to effect an application of the brakes, and means acting on said second manually operative means for holding both of the manually operative means out of their normal release positions in opposition to said yielding means, when the said second manually operative means is operated to effect an application of the brakes.

28. A control device comprising a casing having a chamber therein, a rotary control valve operative in said chamber and having a substantially central opening therethrough, an operating member having a head portion in said chamber and a stem portion extending into the opening in said rotary valve in interlocking relation thereto, a second operating member having a yoke portion cooperatively fitting over the head portion of the first said operating member to interlock the two said operating members, and having also a stem portion projecting exteriorly of said casing, and manually operative means adapted to be removably secured on the exteriorly projecting end of the stem portion of the last said operating member for operatively turning the said operating members and said rotary valve.

29. A control device comprising a casing having a chamber therein, a rotary control valve operative in said chamber and having a substantially central opening therethrough, an operating member having a head portion in said chamber and a stem portion extending into the opening in said rotary valve in interlocking relation thereto, a second operating member having a yoke portion cooperatively fitting over the head portion of the first said operating member to interlock the two said operating members, and having also a stem portion projecting exteriorly of said casing, and manually operative means adapted to be removably secured on the exteriorly projecting end of the stem portion of the last said operating member for operatively turning the said operating members and said rotary valve, and head portion of the first said operating member having a transverse bore and a latch member in said bore yieldingly urged out of said bore, said casing having a plurality of spaced notches on the inner surface thereof within the said chamber, each notch adapted to receive the latch member for defining a different operative position of said rotary valve.

30. In combination, a cylindrical shaft having a transverse bore extending therethrough and a pair of spaced longitudinally extending bores, each opening at one end thereof at one end of the shaft, and at the opposite end thereof into the transverse bore, a sleeve in which said shaft rotates, having a lubricant swab inset therein exposed to said shaft and in registry with the transverse bore in said shaft, and a lever for rotating said shaft having a pair of spaced pins thereon adapted to be received in the spaced longitudinal bores, respectively, for interlocking said shaft and said lever, lubricant being suppliable to said swab for lubricating the contacting surfaces of the sleeve and the shaft, through said longitudinal bores and the transverse bore when said lever is removed from the shaft.

31. A control device, comprising a casing, a rotary member supported in said casing for performing a control operation and having a yoke at the end thereof, an operating member pivotally mounted on said rotary member in interlocking relation with said yoke and adapted to be manually rotated to rotate the rotary member, a valve in said casing having an operating stem protruding beyond the surface of the casing and operative to perform another control operation, and a bail pivotally mounted on said casing and engaging the protruding end of the operating stem of said valve, said operating member having an extension thereon adapted to engage and move the bail to move the operating stem to operate the said valve when the operating member is pivotally moved relative to said rotary member.

32. A control device, comprising a casing, a rotary member supported in said casing for performing a control operation and having a yoke at the end thereof, an operating member pivotally mounted on said rotary member in interlocking relation with said yoke and adapted to be manually rotated to rotate the rotary member, a valve in said casing having an operating stem protruding beyond the surface of the casing and operative to perform another control operation, a bail pivotally mounted on said casing and engaging the protruding end of the operating stem of said valve, said operating member having an extension thereon adapted to engage and move the bail to move the operating stem to operate the said valve when the operating member is pivotally moved relative to said rotary member, and yielding means interposed between the operating member and said rotary member for resisting pivotal movement of the operating member relative to the rotary member.

33. A brake control device comprising a casing, a rotary shaft supported in said casing and manually operative to control the brakes, said rotary shaft having thereon a friction disc, a friction shoe pivotally mounted on said casing, and resilient means yieldingly urging the friction shoe pivotally into contact with said friction disc to prevent undesired rotary movement of the said shaft.

34. A brake control device comprising a casing, a rotary shaft supported in said casing and manually operative to control the brakes, said rotary shaft having thereon a friction disc, a friction shoe pivotally mounted on said casing, resilient means yieldingly urging the friction shoe pivotally into contact with said friction disc to prevent undesired rotary movement of the said shaft, and means for varying the tension of said resilient means to cause variation in the frictional resistance to rotation of the shaft exerted by the friction shoe.

35. In a fluid pressure brake, in combination, a brake valve device operative manually to control the brakes and operative also automatically to control the brakes, and a control device for effecting operation of said valve device manually and automatically, said control device including a casing, a pair of levers pivotally joined at one end, one of the said levers being pivotally mounted at the other end thereof on said casing, valve means for controlling the automatic operation of said valve device, said one lever having a transverse lug thereon between the ends thereof adapted upon pivotal movement of said one lever about the end thereof pivoted on the casing to effect operation of said valve means, the other of said levers being adapted upon manually effected pivotal movement thereof relative to said one lever to effect operation of said valve device.

36. In combination, a socket member having a receiving bore, a member conforming to the bore of said socket member and received therein, said member having a transverse recess therein, a bell crank latch lever having an inner arm and an outer arm and pivotally mounted at the fulcrum thereof within the recess in said member, and yielding means interposed in said recess between the inner arm of the latch lever and the wall of said member and tending to urge the outer arm of the latch lever out of said recess, said outer arm being moved into the recess against the force of said yielding means upon insertion of said member in the bore of the socket member, said socket member having a recess in the wall thereof into which the outer arm of the latch lever is moved by said yielding means to lock the member in the bore of the socket member when fully inserted therein.

37. In combination, a socket member having a receiving bore, a member conforming to the bore of said socket member and received therein, said member having a transverse recess therein, a bell crank latch lever having an inner arm and an outer arm and pivotally mounted at the fulcrum thereof within the recess in said member, yielding means interposed in said recess between the inner arm of the latch lever and the wall of said member and tending to urge the outer arm of the latch lever out of said recess, said outer arm being moved into the recess against the force of said yielding means upon insertion of said member in the bore of the socket member, said socket member having a recess in the wall thereof into which the outer arm of the latch lever is moved by said yielding means to lock the member in the bore of the socket member when fully inserted therein, and a plunger slidable in said member adapted to engage the inner arm of the latch lever and move it in opposition to said yielding means and thereby move the outer arm of the latch lever into the recess of said member and out of the recess in said socket member to permit removal of the said member from the bore of the socket member.

38. In a door and sanding control apparatus, in combination, a pair of reservoirs normally charged with fluid under pressure, a manually operative valve device for controlling the supply of fluid under pressure from one of said reservoirs for effecting operation of the doors, a sanding device, and a manually operative valve device for controlling the supply of fluid under pressure from the other of said reservoirs to the said sanding device.

39. In a fluid pressure brake, means manually movable out of a normal release position to effect application of the brakes, resilient means yieldingly resisting movement of the manually movable means from its normal position and tending to return it toward its normal position, and a second resilient means effective to oppose the first resilient means only when the manually operative means is out of its normal position, movement of the manually movable means from its normal position being thereby resisted while movement of the manually movable means when it is out of its normal position is relatively unresisted.

40. In a fluid pressure brake, means manually movable out of a normal release position to effect application of the brakes, resilient means yieldingly resisting movement of the manually movable means from its normal position and tending to return it toward its normal position, a second resilient means adapted to substantially oppose the force of the first said resilient means and thereby prevent movement of the manually movable means by the first resilient means upon the relief of pressure manually applied to the manually movable means, and means controlled by the manually movable means for rendering the said second resilient means effective only when the manually movable means is out of its normal position.

41. In a brake and door control apparatus, in combination, means operative manually to effect application of the brakes to a degree in accordance with the degree of movement thereof out of a normal release position thereof, means operative to control the doors, means normally in a position to prevent operation of the door control means to door opening position, means movable in accordance with the operative movement of the brake application means, adapted upon operation of the brake application means to effect an application of the brakes, to move first a uniform degree relative to the preventing means and then to engage and move the preventing means, said preventing means being rendered ineffective to prevent operation of the door control means to door opening position upon at least a certain uniform degree of movement thereof by said last means, said last means being adapted upon reverse movement of said brake application means toward its release position, to move first a uniform degree relative to the preventing means and then to engage and return said preventing means toward its normal position, and said door control means being adapted when in door opening position to prevent return of said preventing means into its normal position, and means for varying the degree of movement of the said last means relative to said preventing means occasioned upon reverse movement of the brake application means toward release position and thereby varying the total degree of reverse movement of said last means permitted before the preventing means is stopped by the door control means while in door opening position.

42. In a brake and door control apparatus, in combination, means operative manually to effect application of the brakes to a degree in accordance with the degree of movement thereof out of a normal release position thereof, means operative to control the doors, means normally in a position to prevent operation of the door control means to door opening position, means movable in accordance with the operative movement of the brake application means, adapted upon operation of the brake application means to effect an application of the brakes, to move first a uniform degree relative to the preventing means and then to engage and move the preventing means, said preventing means being rendered ineffective to prevent operation of the door control means to door opening position upon at least a certain uniform degree of movement thereof by said last means, said last means being adapted upon reverse movement of said brake application means toward its release position, to move first a uniform degree relative to the preventing means and then to engage and return said preventing means toward its normal position, and said door control means being adapted when in door opening position to prevent return of said preventing means into its normal position, and means for selectively varying the degree of movement of said last means relative to said preventing means occasioned upon movement of the brake application means away from and toward release position to cause variation, individually or jointly, in the total degree of movement of said last means required before operation of the door control means out of door closing position is permitted and in the total degree of reverse movement of said last means permitted while the door control means is in door opening position.

43. In a brake and door control apparatus, in combination, means operative manually to control the brakes, means operative manually to control the doors, means normally in a position to prevent operation of the door control means to effect opening of the doors, and means movable to varying degrees out of a normal position according to the degree of application of the brakes, said last means being moved initially a certain uniform amount out of its normal position without effecting movement of the preventing means and then being effective upon further movement to cause movement of the preventing means out of the normal position thereof to free the door control means for operation to effect opening of the doors.

44. In a brake and door control apparatus, in combination, means operative manually to control the brakes, means operative manually to control the doors, means normally in a position to prevent operation of the door control means to effect opening of the doors, means movable to varying degrees out of a normal position according to the degree of application of the brakes, said last means being moved initially a certain uniform amount out of its normal position without effecting movement of the preventing means and then being effective upon further movement to cause movement of the preventing means out of the normal position thereof to free the door control means for operation to effect opening of the doors, and adjustable means for varying the amount that the said last means may move initially out of its normal position without causing movement of the preventing means.

ELLIS E. HEWITT.

CERTIFICATE OF CORRECTION.

Patent No. 2,071,755.

February 23, 1937.

ELLIS E. HEWITT.

It is hereby certified that error appears in the printed specification of the above numbered patent requiring correction as follows: Page 14, second column, line 65, claim 29, for "and" second occurrence, read the; and that the said Letters Patent should be read with this correction therein that the same may conform to the record of the case in the Patent Office.

Signed and sealed this 29th day of June, A. D. 1937.

Henry Van Arsdale

Acting Commissioner of Patents.

(Seal)